United States Patent [19]
Snyder et al.

[11] Patent Number: 5,384,704
[45] Date of Patent: Jan. 24, 1995

[54] PROGRAMMABLE VEHICLE MODEL

[75] Inventors: Kent D. Snyder, Mt. Clemens; Gerald J. Zyski, Jr., Hazel Park; Kim A. Zeile, Clarkston; James F. Runstrom, Drayton Plains, all of Mich.

[73] Assignee: Prefix Corporation, Rochester Hills, Mich. ; a part interest

[21] Appl. No.: 870,590

[22] Filed: Apr. 17, 1992

[51] Int. Cl.⁶ .................. G06F 15/46; B60J 7/057
[52] U.S. Cl. ................... 364/424.01; 364/425; 364/149; 364/474.02; 296/187; 296/223
[58] Field of Search .............. 364/424.01, 474, 148, 364/149, 150, 512, 425; 296/187, 191, 63, 97.11, 216, 219, 220, 227, 223; 180/89.1; 395/118, 120, 919

[56] References Cited

U.S. PATENT DOCUMENTS

| | | | |
|---|---|---|---|
| 3,915,492 | 10/1975 | Agnese | 296/23 C |
| 4,393,450 | 7/1983 | Jerard | 364/474 |
| 4,697,240 | 9/1987 | Cedar et al. | 364/474 |
| 4,998,050 | 3/1991 | Nishiyama et al. | 318/568.1 |
| 5,096,254 | 3/1992 | Sparke | 296/193 |

OTHER PUBLICATIONS

"Moving Ahead . . . or back or up or down . . .", Partnership Press, Apr. 1991, vol. 2, No. 4.
"Computerized Seating Buck: 'The Ultimate Sandbox'", No publication title or date.

Primary Examiner—Thomas G. Black
Assistant Examiner—Tan Q. Nguyen
Attorney, Agent, or Firm—Basile and Hanlon

[57] ABSTRACT

A simulated vehicle includes body panels arranged in a simulated vehicle position and movably mounted on an internal support structure attached to a platform. The body panels are moved by a control unit in any of up-/down, fore/aft, cross car and tilt directions. Certain of the body panels are formed of first and second telescopingly overlapping panel sections which are extendable and retractable with respect to each other by the control unit. The panel sections are configured to present a solid exterior surface in any extended and retracted position.

39 Claims, 12 Drawing Sheets

PROGRAMMABLE VEHICLE MODEL

BACKGROUND OF THE INVENTION

Field of the Invention

The present invention relates, in general, to motor vehicles and, more specifically, to methods and apparatus for designing motor vehicles.

The design of automotive vehicles, such as automobiles, trucks, etc., usually begins with the development of various sketches and drawings showing the shape of the various body panels and other components of the vehicle. Three-dimensional clay models and, more recently, computer generated models, are then created to provide a visual image of the proposed vehicle design. Changes to the shape of the vehicle at this stage entail time consuming, highly skilled labor, even if such changes are on the order of only several millimeters in a particular dimension.

In order to design and market a successful vehicle, an accurate assessment of consumer needs, the market and the competition with regard to size and styling of a vehicle, among other factors, must be determined at an early stage of the vehicle design. Typically, models, known in the industry as "bucks" are constructed to simulate a particular body component or vehicle section, such as the interior passenger compartment of a vehicle, the exterior shell, trunk, engine compartment, undercarriage, etc. Such bucks are designed for a specific vehicle and any changes to the parts thereof require additional labor and time. Furthermore, a number of identical bucks or test stands are designed for each different vehicle model made by a particular manufacturer for use by various design and engineering personnel.

Ergonomics, or the interaction of the vehicle with the user, is becoming an important factor in the design of automotive vehicles. Ergonomics involves the spatial relationship of various components with each other and the user, such as the driver or passenger of a vehicle. In order to provide a comparison of various ergonomic factors, a number of different bucks would be designed, each having a different spacial relationship of components. Consumers sit in or view each buck and provide their opinions in response to detailed questions relating to various facets of each design. This information is utilized by the vehicle manufacturer to develop a new vehicle or to refine an existing vehicle.

In order to expedite the design of a vehicle and to adequately assess all of the ergonomic and other factors associated with the design of a vehicle, attempts have been made to provide universal bucks which are adjustable in size and shape so as to enable a number of different designs to be tested in a time efficient manner. One such attempt by some of the inventors of the present application resulted in the development of a computer controlled buck which incorporated a seat, steering column, instrument panel, gear shifter, floor pan and front and rear seats. Most of the above-named components were variably adjustable in position in up/down or fore/aft directions as well as being adjustably positionable laterally across the width of the test buck. While this buck was effective in evaluating various vehicle interior designs and spatial relationships, it did not incorporate any exterior body panels which would lend it to testing of entire vehicle shapes, both interior and exterior, as well as how such exterior body panels interact spatially with the internal vehicle components and/or passenger.

Thus, it would be desirable to provide a programmable vehicle model which presents an entire full-size vehicle in which substantially all of the vehicle components are adjustable in position with respect to each other to create different vehicle shapes and component spatial relationships. It would also be desirable to provide a programmable vehicle model in which the length, height and width of the vehicle model is adjustable without any gaps appearing between adjacent exterior body panels. It would also be desirable to provide a programmable vehicle model which is easily reconfigurable into the exterior and/or interior dimensions and spatial component relationships of a variety of different sized vehicles.

SUMMARY OF THE INVENTION

The present invention is a programmable vehicle model in which substantially all of the interior and exterior components of the model are adjustable in some or all of the up/down, fore/aft and cross car directions.

The programmable vehicle model includes a platform on which various panel support structures are mounted. A plurality of vehicle body panels are mounted on the support structures in a vehicle body position to simulate a full-size vehicle body. At least certain of the body panels and/or interior components are formed of first and second sections which are mounted in an overlapping, telescopingly adjustable positional relationship. A drive means, mounted on at least one of the first and second sections, adjustably positions the first and second sections with respect to each other at any selectable position to vary at least one of the height, width and length of the overall body panel.

A control means executing a stored control program is provided for controlling the drive means to vary the position of certain or all of the body panels and/or vehicle components.

In a preferred embodiment, a cross car carriage formed of a plurality of movable plates is mounted on the platform and is movable in a lateral direction by the control means to any desired position. A fore/aft carriage formed of another set of movable plates are slidably disposed on the cross car carriage plates to provide controlled fore/aft movement of various body components. Vertical displacement means are also provided for variably displacing certain body components, such as the vehicle hood, roof and trunk in a vertical or up and down direction. Horizontal displacement means are provided for variably displacing various body components including the instrument panel, accelerator and/or brake pedals, steering column, seats, front and rear floor pans, hood, trunk and roof along horizontal axes extending fore/aft and cross car or laterally along the vehicle.

An exterior body panel, such as a door, is formed of first and second telescopingly overlapping sections which are configured such that the first and second sections of each body panel present a solid exterior surface regardless of their degree of overlap with respect to each other. This avoids any unsightly gaps between such body sections which would detract from the overall appearance of the vehicle.

The programmable vehicle model of the present invention overcomes many of the problems associated with previously devised test stands or bucks used to test specific vehicle configurations, such as interior components, exterior body panels, etc. The programmable vehicle model of the present invention controls a large number individual body components thereby enabling substantially all of the components to be adjustably positioned in varying increments to any desired vehicle shape. This allows particular vehicle designs to be tested or assessed from a consumer viewpoint before final dies, tooling, vehicle drawings, etc., are generated. Ergonomic factors relating to the spatial relationship of interior vehicle components and exterior body panels with respect to passengers of the vehicle can also be easily assessed by using the programmable vehicle model of the present invention. Variations in the spatial relationship of any of the vehicle components can be easily implemented in a manner of minutes to test different designs. Furthermore, the programmable vehicle model of the present invention is capable of storing a number of different vehicle body component arrangements such that a large number of different vehicle configurations can be recalled on the programmable vehicle model. Finally, all of the motors, controls and support structure are mounted internally within the programmable vehicle model so as not to hinder viewing of the vehicle.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Figure 1:
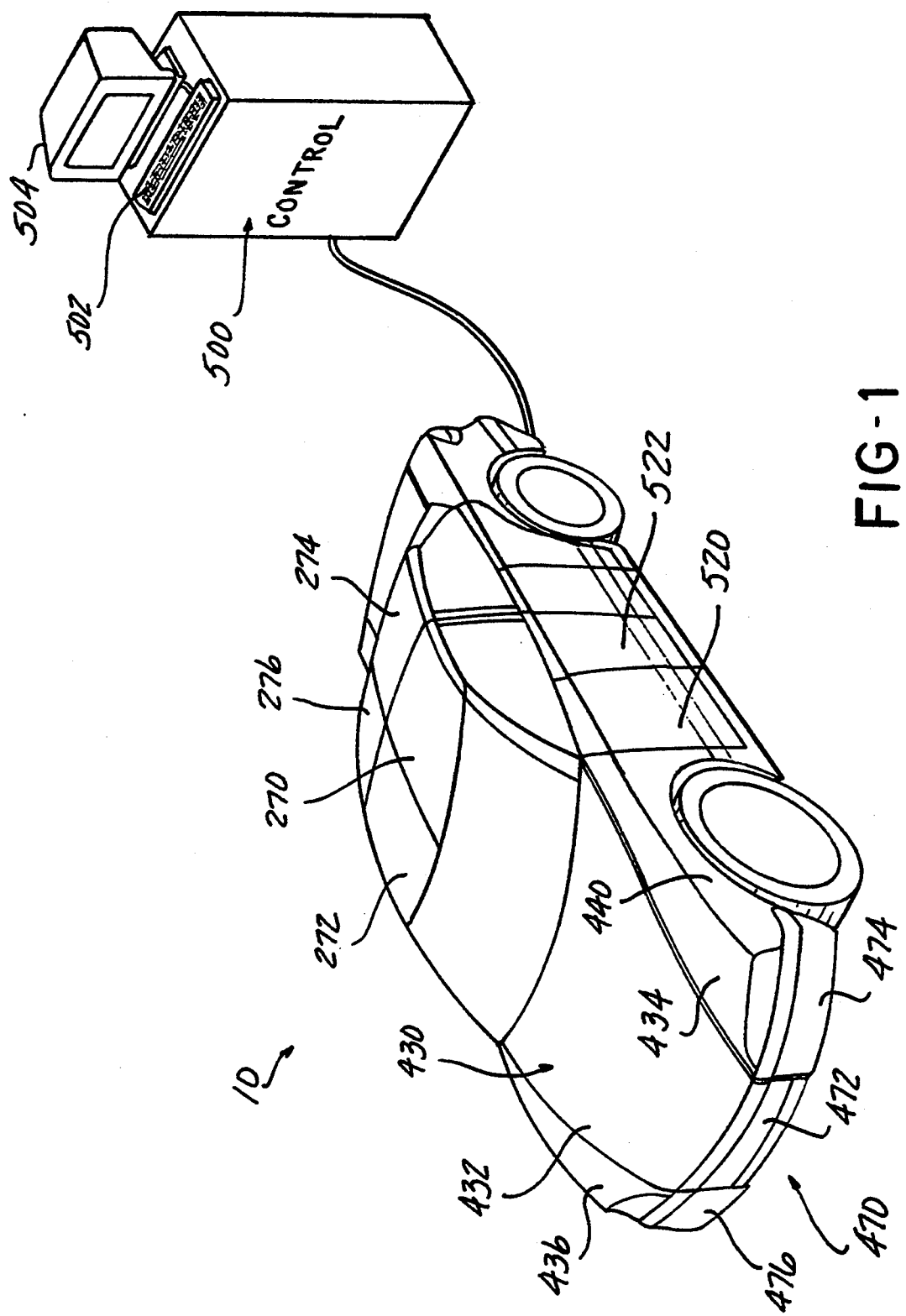
FIG. 1 is a pictorial representation of a programmable vehicle model according to the present invention.

Referring now to the drawing, and to FIG. 1 in particular, there is illustrated a programmable vehicle model 10 which is capable of assuming a practically infinite number of dimensional positions so as to simulate any desired vehicle exterior and interior size and/or configuration.

Generally, the programmable vehicle model includes a platform, internal support structure, movable exterior vehicle body panels and a control means which controls the operation of various electrical drive motors mounted internally within the programmable vehicle model to move the various vehicle components to any selected dimensional position.

Figure 2:
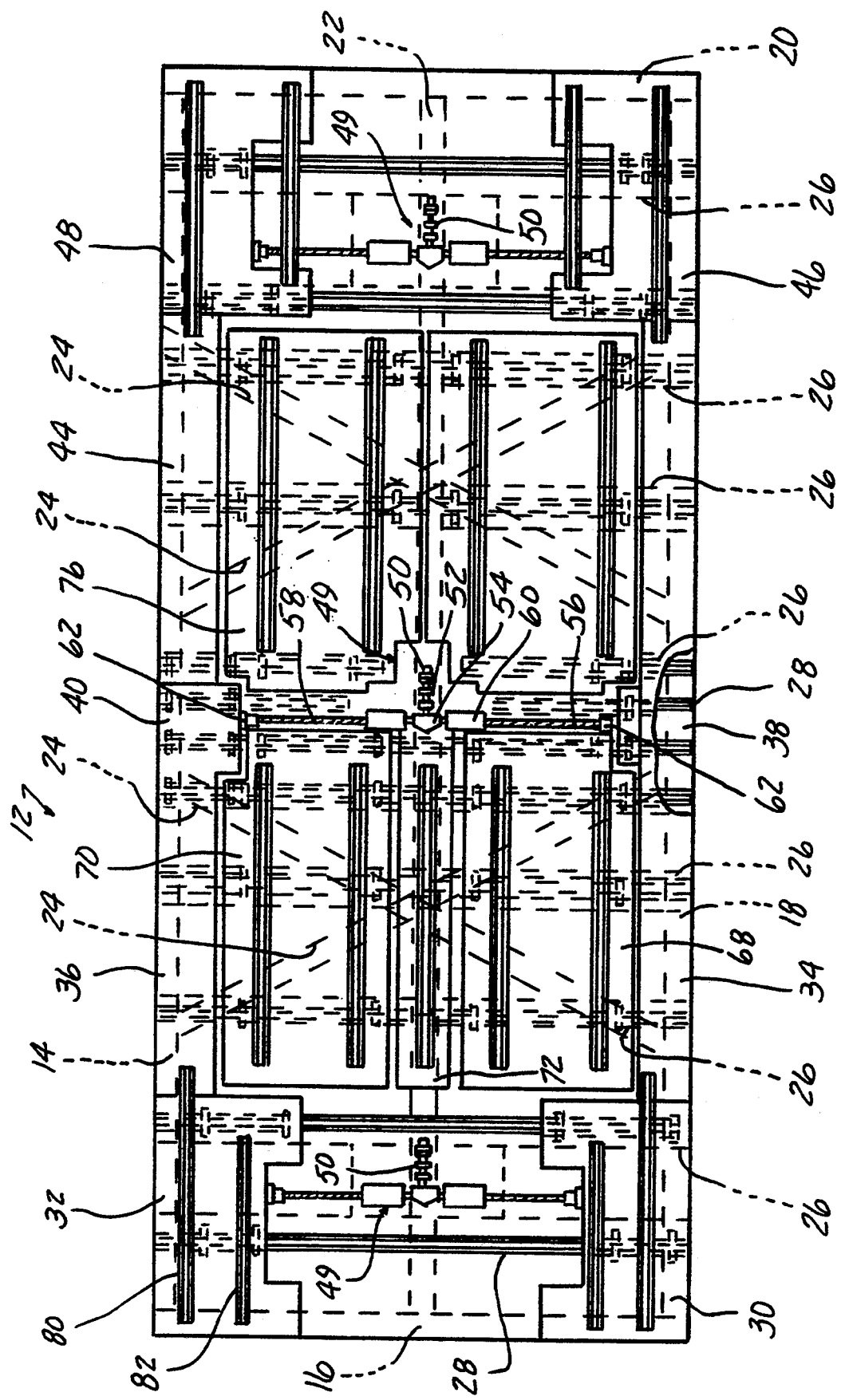
FIG. 2 is a plan view of the cross car carriage of the programmable vehicle model of FIG. 1.
Figure 4:
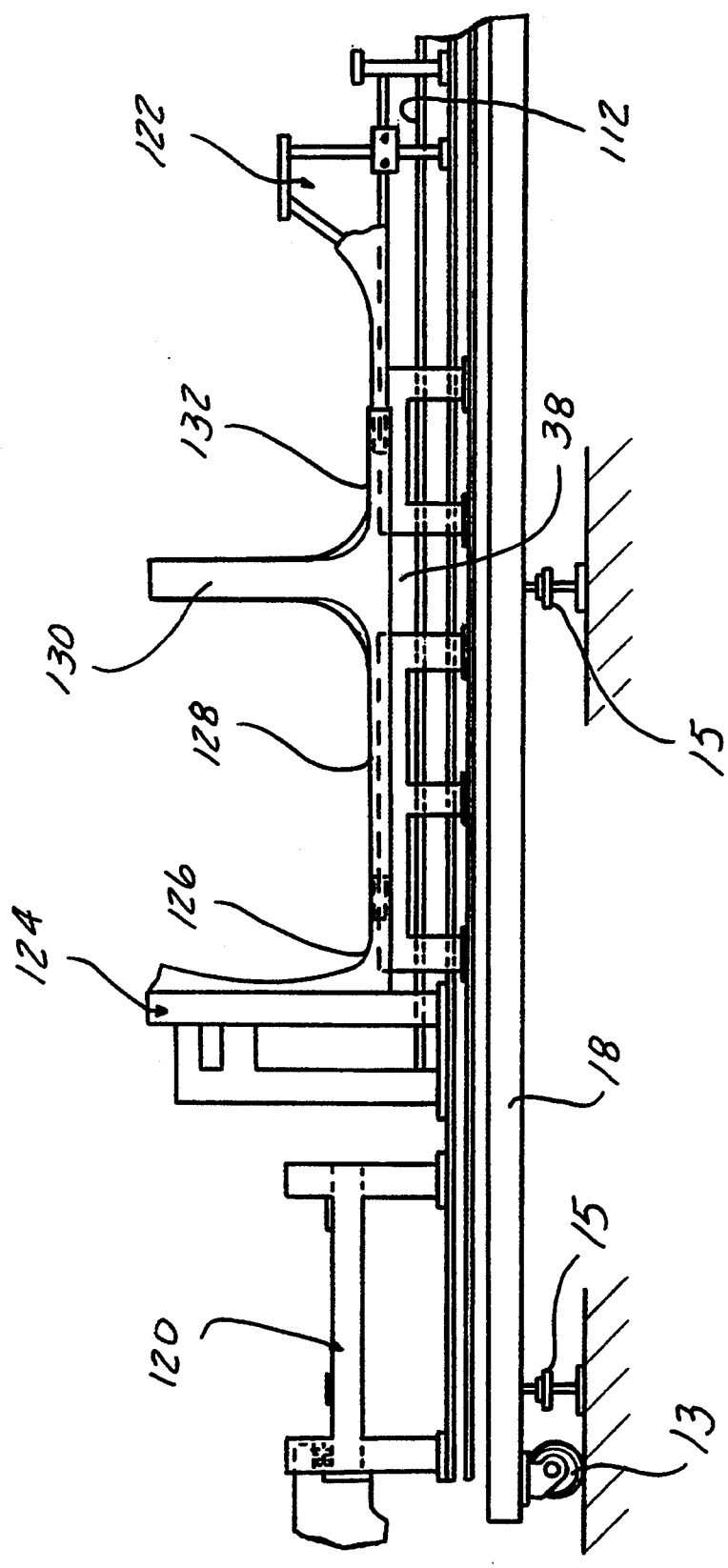
FIG. 4 is a partial, side elevational view showing the internal support structure of the programmable vehicle model of the present invention.

The platform 12, shown in detail in FIG. 2, is in the form of a base constructed of interconnected steel tubular members 14, 16, 18, 20 and 22. Cross braces 24 are interconnected between various ones of the tubular members to provide structural integrity for the base 12. Casters 13 and levelling pads, shown generally in FIG. 4, are provided beneath the base 12 at each corner and centrally along the longitudinal sides to provide a level support surface for the base 12. Electrically actuated jack screws 15 are also provided at the four corners of the base 12 and at a central location along each of the side tubular members 14 and 18 to provide selective positioning of the base 12 in a vertical direction, as described in greater detail hereafter.

A plurality of plates 26 is mounted on the tubular members forming the base 12 and form a part of a cross car carriage which provides cross car adjustment of the width of the programmable vehicle model 10. The plates 26 are spaced along the length of the platform 12 and are secured to the tubular members of the platform by suitable means, such as welding, fasteners, etc. Each plate 26 is provided with at least one laterally extending linear guide rail only one of which is denoted by reference number 28 in FIG. 2. Each linear guide rail 28 includes an upper substantially circular cross section portion on which bearings slidably move.

A plurality of cross car plates are provided on the base and are movably disposed to provide selective variation in the cross car or lateral position of the various components of the programmable vehicle model 10. Specifically, left and right front clip plates 30 and 32, left and right front door plates 34 and 36, left and right B pillar plates 38 and 40, left and right rear door sill support plates 42 and 44, and left and right rear clip plates 46 and 48 are slidably mounted on linear rails 28 on the plates 26. Each of the cross car plates includes open-ended bearings mounted on a bottom surface which slidably engage the linear rails 28 to slidably mount each cross car plate on the linear rails 28 on the platform 12.

The cross car plates are controlled in at least opposed pairs by a suitable cross car drive means 49. The cross car drive means 49, as shown in FIG. 2, preferably comprises an electric stepper motor 50 mounted on one of the plates 26, substantially centrally along the length of the platform 12. The output shaft of the motor 50 is connected through a gear transmission 52 to a 90° gear box 54 which translates the rotational direction of the output shaft of the motor 50 substantially 90°. Two ball screws 56 and 58 extend outward from housings 60 in which each ball screw 56 and 58 is coupled to the 90° gear box 54 to result in simultaneous rotation of each ball screw 56 and 58 upon activation of the motor 50. A conventional ball nut, such as an anti-backlash ball nut sold by Thompson Saginaw, Series SEL, is threadingly mounted on each ball screw 56 and 58. Each ball nut 62 is threadingly attached to one of the B pillar plates 38 and 40 to cause translation of each B pillar plate 38 and 40 upon rotation of the ball screws 56 and 58 in either direction of rotation.

The cross car plates on each longitudinal side of the platform 12 are rigidly interconnected for simultaneous movement. Thus, the plates 30, 34, 38, 42 and 46 on the left side of the platform 12 are interconnected for simultaneous movement inboard or outboard from the center of the platform 12 depending upon the direction of rotation of the ball screw 56. Similarly, the plates 32, 36, 40, 44 and 48 on the right-hand side of the platform 12 are also rigidly interconnected for simultaneous movement upon rotation of the ball screw 58. Each set of interconnected plates moves simultaneously with the other set of plates to vary the lateral dimension or width of the complete cross car carriage mounted on the platform 12.

The plurality of cross car drive means 49, each including a motor 50, a pair of ball screws 56 and 58, and gears are longitudinally spaced along the length of the platform 12 for simultaneously driving the interconnected cross car carriage plates in a uniform manner. An additional motor and ball screw drive is mounted at opposite ends of the platform 12 and interconnected between the left and right-hand front clip plates 30 and 32 and the left and right-hand rear clip plates 46 and 48, for example.

Each motor 50, as well as all of the motors described hereafter, includes an electrically operable friction brake integrally coupled with the motor output shaft. For example, the friction brake can be one sold by Carlyle Johnson, Model No. FSBS-001 or 002. The brake is activated by a control means, as described hereafter, to positively lock the motor output shaft in a fixed position when the motor is de-energized or when power is removed from the control means.

In addition to the plates described above which are mounted on essentially the longitudinal sides of the platform 12, a number of other crosswise movable plates are also movably mounted on certain of the plates 26 for cross car or lateral movement. Thus, left front and right front passenger compartment plates 68 and 70 are movably mounted on the platform 12 on opposite sides of a centrally located console support plate 72. Left and right-hand rear passenger compartment support plates 74 and 76 are also mounted on the platform 12 between the outboard plates 42 and 44, respectively, and longitudinally between the left and right front passenger compartment plates 68 and 70 and the left and right rear clip support plates 46 and 48.

At least a pair of spaced longitudinally extending linear rails 29 are mounted on each of the cross car carriage plates described above. Thus, the right front clip plate 32 includes a pair of longitudinally extending linear rails 80 and 82. Each of the rails 80 and 82 has a generally circular cross section upper portion which slidably receives a bearing to movably mount another plate to the right-hand front clip plate 32, as described hereafter. The rails 80 and 82 are mounted to the plate 32 by any suitable means, such as welding, fasteners, etc.

Figure 3:
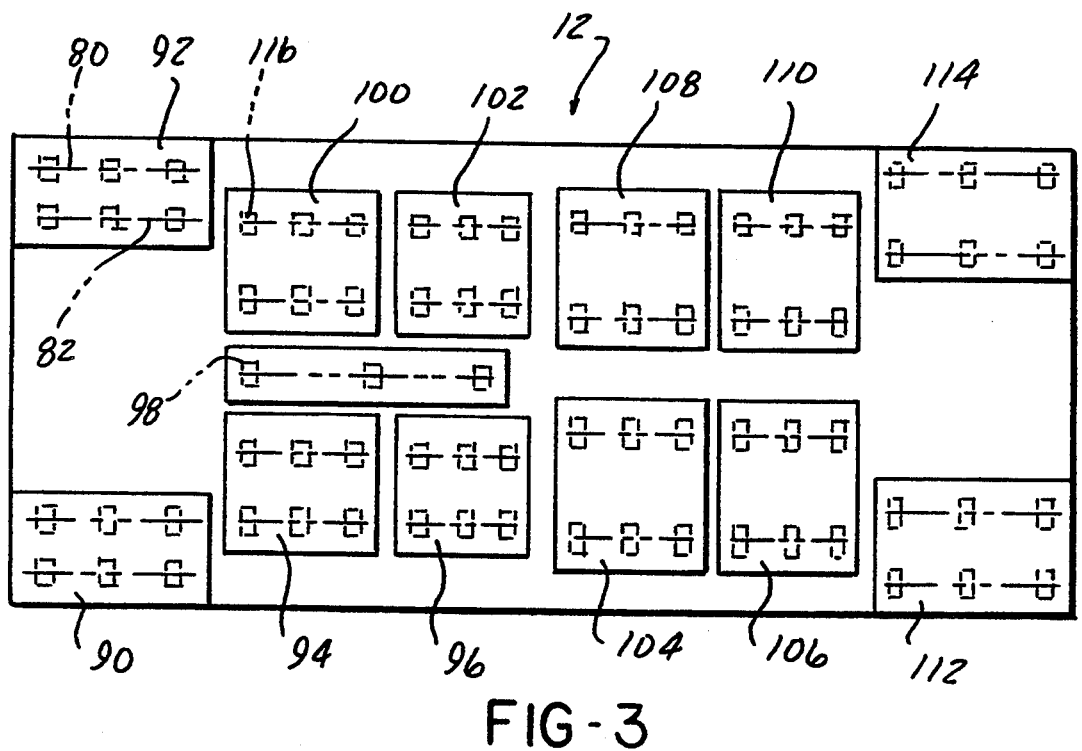
FIG. 3 is a plan view of the fore/aft carriage of the programmable vehicle model.

Referring now to FIG. 3, there is depicted the fore-/aft carriage which is formed of a plurality of individually longitudinally movable plates which slidably engage the linear rails 80 and 82 on certain of the cross car carriage plates described above. By way of example only, the fore/aft carriage includes left and right front support plates 90 and 92, respectively, left front floor pan and left front seat plates 94 and 96, respectively, a center console plate 98, a right front floor pan and front seat plates 100 and 102, respectively, left rear floor pan and left rear seat plates 104 and 106, respectively, right rear floor pan and rear seat support plates 108 and 110, respectively, and left and right rear quarter panel/trunk support plates 112 and 114, respectively. Each of the fore/aft plates is substantially planar and is provided with coaxially aligned bearings, denoted in general by reference number 116, mounted on a bottom surface of each plate and which slidably engage certain of the linear rails 80 and 82 on the cross car carriage plates corresponding thereto. Thus, the fore/aft front support plates 90 and 92 are respectively mounted on the front left and right front clip plates 30 and 32, respectively; the left floor pan and seat plates 94 and 96, respectively, are slidably mounted on the left passenger compartment plate 68; and the right front floor pan and front seat plates 100 and 102, respectively, are slidably mounted support member 130 is fixedly mounted on the B pillar support plate 38 and remains stationary despite any longitudinal or cross car variation in the dimensions of the programmable vehicle model 10. A rear door sill front extension 132 extends rearward from the B pillar support member 130 and is disposed in telescoping relationship with a rear door sill panel 134 which is fixedly connected to and movable with the rear clip 122. In this manner, longitudinal variations in the length of the programmable vehicle model 10, as described hereafter, will cause the front door sill extension 132 to telescope with regard to the fixed door sill 128 and the rear door sill extension 132 to telescope with respect to the associated rear door sill panel 134.

Figure 5:
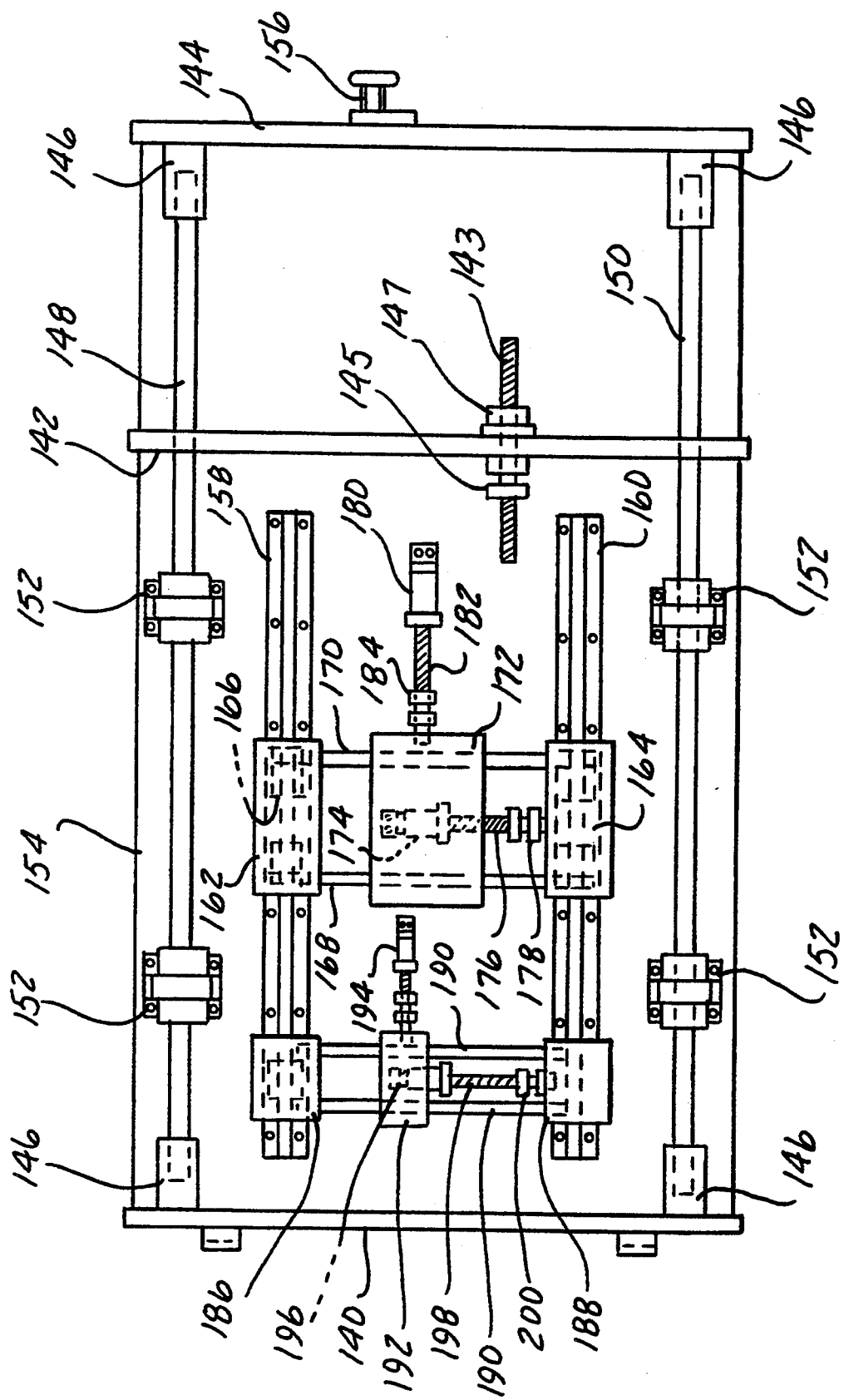
FIG. 5 is a side elevational view of a typical door employed in the programmable vehicle model shown in FIG. 1.

FIG. 5 depicts the internal structure of one of the four doors of the programmable vehicle model 10. As such structure is identical for each of the doors, FIG. 5 will be used to describe the same structure which is applicable to each of the four doors of the programmable vehicle model 10.

Three vertically extending plates 140, 142 and 144 are longitudinally spaced apart and mounted between conventionally shaped inner and outer door panels. A pair of bosses 146 are mounted on the plates 140 and 144 and support upper and lower rails 148 and 150, respectively, therebetween. The upper and lower rails 148 and 150 are each supported in spaced bearings denoted in general by reference number 152 which are fixedly secured to a door inner plate 154. The upper and lower rails 148 and 150 slidably extend through the intermediate plate 142 and guide the longitudinal extension and retraction of the door. A guide screw 143 extends through the plate 142. A ball nut 145 mounted on one side of the plate 142 causes rotation of the guide screw 143 during movement of the door panels. A friction brake 147 is mounted on the other side of the plate 142 to positively lock the screw 142 in a fixed, non-rotatable position to enable the door to be opened and closed in a normal fashion. on the right front cross car plate 70. The right rear floor pan and rear seat plates 104 and 106 are slidably mounted on the rear passenger compartment plate 74; the right rear floor pan and rear seat plates 108 and 110 are slidably mounted on the right rear cross car plate 76; the left quarter panel trunk support plate 112 is slidably mounted on the left rear clip plate 46; and the right quarter trunk panel support plate 114 is slidably mounted on the right rear clip plate 48. The console plate 98 is slidably mounted on the console support plate 72 shown in FIG. 2. Each plate 90, 92, 94, 96, 98, 100, 102, 104, 106, 108, 110, 112 and 114 is individually controllable by a motor and ball screw/ball nut arrangement as described hereafter.

As shown in FIG. 4, the left front plate 90 has a support structure 120 mounted thereon which supports the left front fender, bumper or front facia, A pillar, left front tire and the left hood lift and tilt mechanism. The opposed right support plate 92 has a similar support structure mounted thereon. It will further be understood that the following description of the various components mounted on the fore/aft support plates are substantially identical from left-hand to right-hand sides of the platform 12. A rear clip structure 122 is fixedly mounted on the left rear clip plate 112 and supports the rear quarter panel, rear wheel and a left side portion of the rear deck lid.

As shown in FIG. 4, an A pillar support member 124 is mounted on the left support plate 90 and is part of the support structure forming the front clip 120. The A pillar support member 124 is in the form of a U-shaped, open-sided channel which supports the front door hinges, a front door extension panel, a front door sill extension panel 126 and the left front lower fender. The front door sill extension panel 126 is disposed in telescoping relationship with a fixed front door sill panel 128 which is fixedly attached to a B pillar support member 130. The B pillar The first plate 140 is connected by a pair of hinges to the A pillar support member 124 and provides normal pivotal movement of the door between open and closed positions. The plate 144 supports an electrical solenoid-operated door striker 156 for locking the door in the closed position. As the A pillar support member 124 is longitudinally slidably with the front clip plate 90, longitudinal movement of the front clip plate 90 in either direction will cause a corresponding movement of the plate 140 on the door and thereby result in an extension or retraction of the two overlapping door panels 520 and 522, FIG. 1, which are respectively mounted to the left-most plate 140, and to the plates 142 and 144.

The programmable vehicle model 10 also provides for up and down and fore and aft movement of the door armrests and the door window regulator in each door. These movements are provided by means of a pair of linear rails 158 and 160 mounted on the door plate 154 and extending longitudinally along the door plate 154. First and second slidable brackets 162 and 164, each carrying a pair of coaxial bearings 166, are slidably mounted on the linear rails 158 and 160, respectively. A pair of vertically extending shafts 168 and 170 extend between the brackets 162 and 164. A armrest support plate 172 is slidably mounted about the shafts 168 and 170. A drive motor 174 is fixedly mounted to the plate 172 and has a rotatable ball screw 176 extending outward therefrom. A conventional ball nut 178 is threadingly engaged with the ball screw 176 and is fixedly secured to one of the plates, such as the plate 164. In this manner, activation of the motor 174 will cause movement of the plate 172 depending upon the direction of rotation of the ball screw 176. A second motor 180 is mounted on the door plate 154 and has a rotatable ball screw 182 extending outward therefrom. A ball nut 184 is threadingly engaged by the ball screw and is fixedly attached to the plate 172 to control longitudinal movement of the plate 172 and the attached door armrest. Rotation of the ball screw 182 upon activation of the motor 180 will cause the plate 172 carrying the door armrest and both plates 162 and 164 to slide along the rails 158 and 160 to the desired longitudinal position within the door.

A similar position control mechanism is provided for the door window regulator. Brackets 186 and 188 are slidably mounted on the linear rails 158 and 160. A pair of vertically extending shafts 190 extend between the brackets 186 and 188 and slidingly support a window regulator support plate 192. A drive motor/ball screw/ball nut arrangement 194, identical to that described above for the door armrest position control, is mounted on the door plate 154 and engages the window regulator support plate 192 to control longitudinal positioning of the window regulator support plate and the attached window regulator within the door. A second motor 196 is mounted to the window regulator support plate 192 and drives a ball screw 198 which engages a ball nut 200 fixedly connected to one of the brackets, such as bracket 188, to control the vertical position of the window regulator support plate 192 and the attached window regulator.

Figure 6:
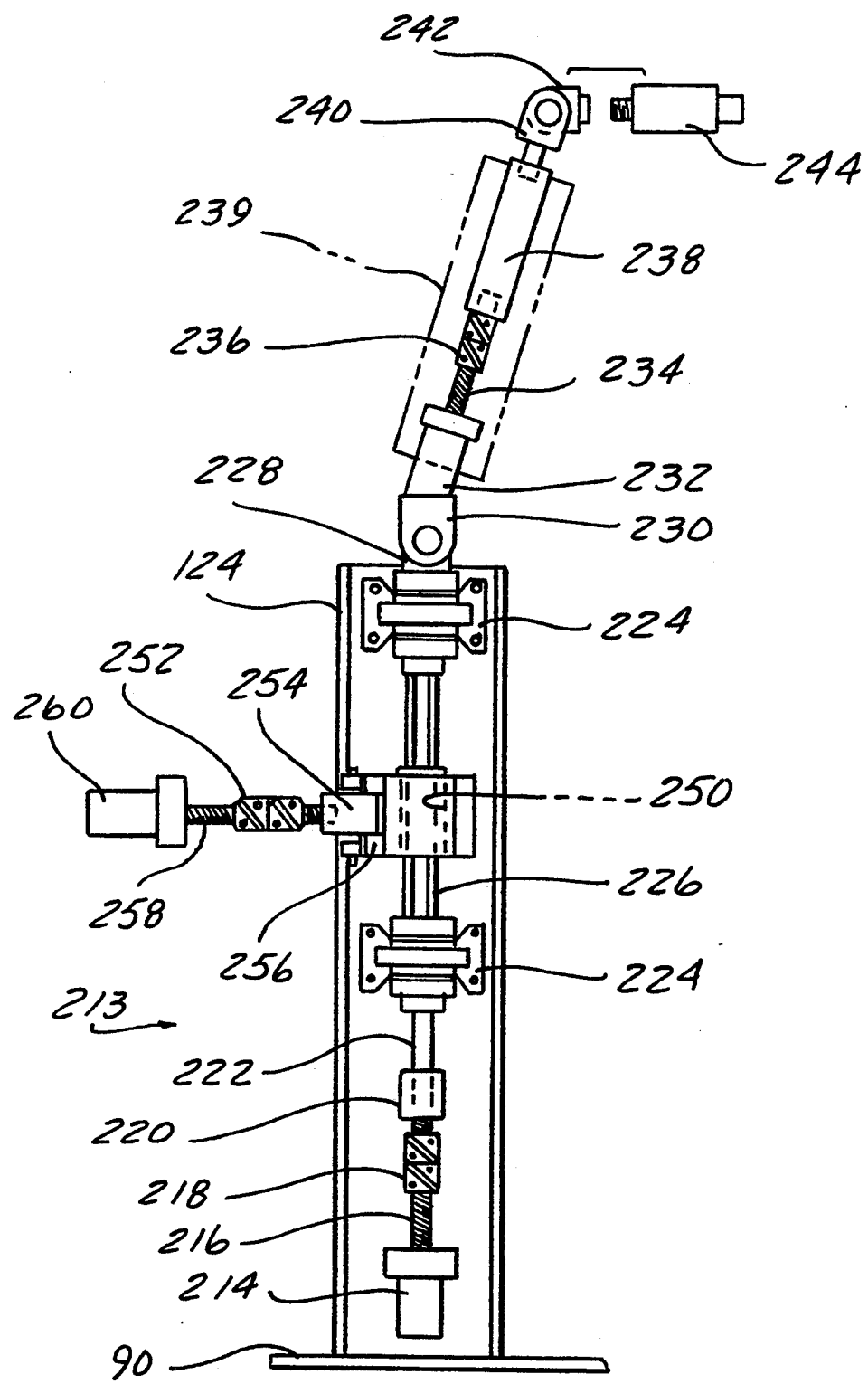
FIG. 6 is a pictorial representation of the programmable vehicle model roof panel displacement means.

The programmable vehicle model 10 is provided with a variable dimension roof structure 210. Vertical up and down positioning of the roof 210 is provided by a plurality of vertical displacement means mounted in all four of the A and C support pillars, such as the A support member or pillar 124 shown in FIG. 4. As each vertical displacement means is identical, the vertical displacement means 213 shown in FIG. 6 will be understood as applying to each of the four vertical roof structure drive mechanisms.

Figure 14:
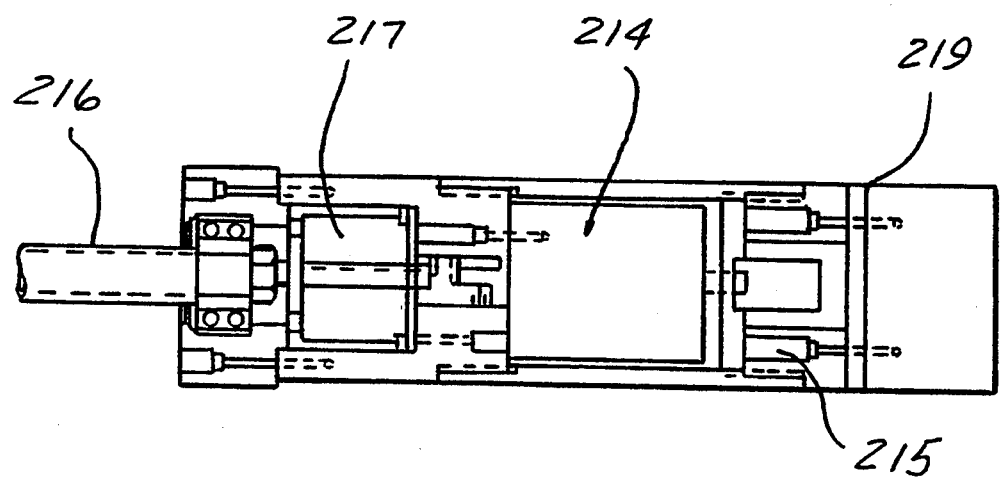
FIG. 14 is an interior view of a stepper motor, gear, friction brake and ball screw used in the programmable vehicle model.

As shown generally in FIG. 14, an electrically controlled friction brake 215, as described above, and a gear reducer 217 are coupled to a motor 214 and mounted with the motor 214 in a housing 219.

The first electrical stepper motor 214 is fixedly mounted within the A pillar support member 124 by means of suitable fasteners, clamps, etc. A rotatable ball screw 216 extends outward from the motor 214 and threadingly engages a ball nut 218 which is fixedly mounted to a hollow tube 220. A rotatable shaft 222 is mounted in and extends outward from one end of the tube 220. The shaft 222 extends through a bearing 224 mounted on the A pillar support member 124. A central portion of the shaft 222 is formed as a spline 226. A pivot block 228 is attached to or formed on one end of the shaft 222 and is located just above the upper edge of the A pillar support member 124. Depending on the direction of rotation of the motor output shaft 216, the shaft 222 will be vertically displaced either up or down to raise or lower the vehicle roof.

A clevis 230 is pivotally connected to the pivot block 228 by means of a pivot pin, not shown. The clevis 230 is mounted at one end of a second electrical, bi-directional stepper motor 232. A ball screw 234 is rotated by the second stepper motor 232 and threadingly engages a ball nut 236. The ball nut 236 threadingly engages a tubular extension 238. A second clevis 240 is connected to the opposite end of the tubular extension 238 and receives a pivot member 242 in the form of a hollow tube having internal threads at one end. The pivot member 242 threadingly engages a bearing 244 mounted on the programmable vehicle model roof 210 as described hereafter.

A stretchable sleeve 239, formed of a spandex or other elastic material, surrounds the motor 232, the ball screw 234 and the tubular extension 238 and is attached to the motor 232 and the tubular extension 238 at opposite ends. The sleeve 239 thus completely covers the internal roof drive components even when the overall length of the components is extended by the drive motor 232 and ball screw 234 to provide an aesthetic appearance within the interior of the programmable vehicle model 10.

A spline nut 250 slidably engages the splines 226 on the shaft 222. A clamp 252 surrounds and fixedly engages the spline nut 250. The clamp 252 is formed with a pair of spaced arms which pivotally receive a pivot member 254 which is pivotally connected thereto by a pivot pin. A ball nut 256 is threadingly connected to the pivot member 254 and threadingly engages a ball screw 258 extending from and rotated by a third electrical stepper motor 260. The stepper motor 260 is mounted on the front clip support 120 and, when activated, causes rotation of the shaft 222 on which the splines 226 are mounted via rotation of the spline nut 250.

Figure 7:
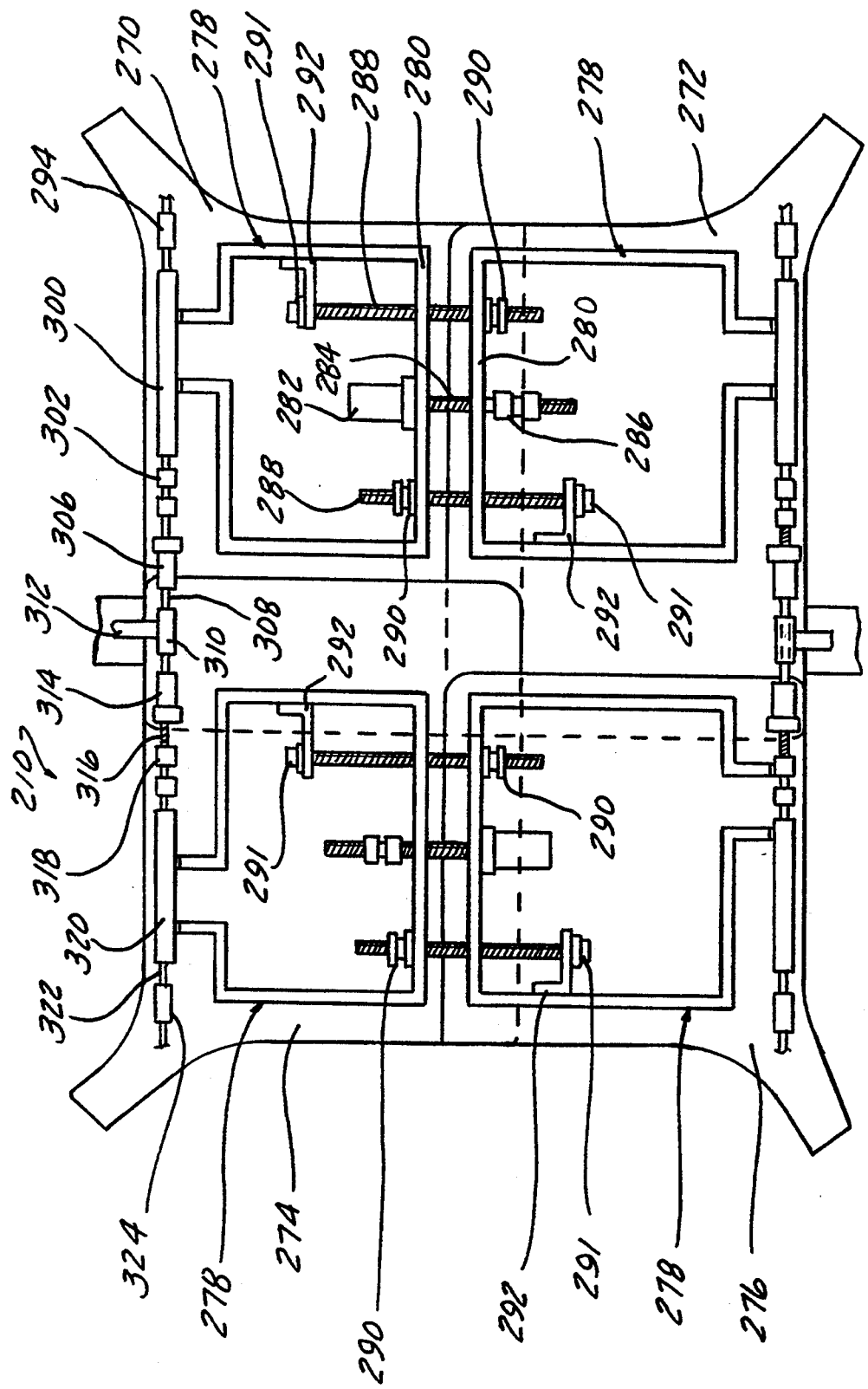
FIG. 7 is a plan view showing the underside of the roof of the programmable vehicle model shown in FIG. 1.

The use of the roof vertical roof displacement means described above and shown in FIG. 6 will now be described in conjunction with the programmable vehicle model roof structure 210 shown in detail in FIG. 7. As shown in FIGS. 1 and 7, the programmable vehicle model roof structure 210 is formed of four separately movable, overlapping roof panels 270, 272, 274 and 276. The front-most roof panels 270 and 272 are arranged in an overlapping pair with the roof panel 272 having a portion disposed below one side edge of the roof panel 270.

Although not shown, the windshield of the programmable vehicle model 10 is pivotally mounted at an upper edge to two telescoping frame members respectively attached to the front edges of the roof panels 270 and 272. The windshield extends below the cowl of the hood 430 and is thus capable of angular tilting along with angular and vertical movements of the A pillars is described herein.

An inner, substantially four-sided frame 278 formed of a bent planar strip is mounted by adhesive or other suitable means to the interior surface of each roof panel 270, 272, 274 and 276. The frame members 278 on two adjacent roof panel sections 270 and 272 each have a wall 280 disposed in spaced, parallel relationship with the corresponding wall 280 in the adjacent frame 278. An electric drive motor 282 is threadingly connected to one of the wall members 280. The ball screw 284 driven by the motor 282 extends through aligned apertures in the two adjacent wall members 280 on the two adjacent frames 278. A ball nut 286 is threadingly connected to the opposed wall member 280 and threadingly receives the ball screw 284 therethrough. Activation of the motor 282 will thus separate or pull together the two adjacent frames 278 and thereby vary the positional overlap of the adjacent roof panels 272 and 274.

At least one and preferably a pair of ball screw shafts 288 also rotatingly extend through the adjacent wall members 280 of the two adjacent frames 278. A ball nut 290 is mounted on one end of each of the ball screw shafts 288 and threadingly engages a side wall of one of the frames 278. A friction brake 291 is mounted on one end of each ball shaft 288 and is connected to the respective frame 278 by a bracket 292. The shafts 288 provide a guide for maintaining the frames 278 in alignment during transverse movement of the frames 278. The brakes 291 lock two laterally adjacent frames together for fore and aft movement or to hold the roof 210 in a fixed position.

A similar drive arrangement and ball screw shafts is provided for the rear pair of roof panels 274 and 276 to provide transverse extension and retraction of the rear roof panels 274 and 276 with respect to each other.

Fore and aft positional changes in the roof panels 270, 272, 274 and 276 are provided by opposed drive mechanisms mounted to the frames 278 and located between and connected to the A, B and C pillars of the programmable vehicle model 10. As both drive mechanisms are identical, only one will be described hereafter.

As shown in FIG. 7, the bearing 244 pivotally connected to the drive mechanism mounted in the A pillar support member 124 is threadingly connected to a tubular shaft 300. The shaft 300 is disposed below the inner surface of the roof panel 270 along the side edge thereof and is connected by suitable fasteners, welding, etc., to the frame 278 mounted on the roof panel 270. The opposite end of the tubular shaft 300 is threadingly connected to a ball nut 302 which threadingly engages a ball screw 304 driven by a first electric motor 306. The motor 306 is mounted on the roof structure 210 by means of a rotatable shaft 308 mounted in a bushing 310 to which the B pillar vertical drive mechanism 312 is connected. Continuing from the bearing 310, a second drive motor 314 is fixedly connected to the rotatable shaft 308. The second drive motor 314 rotates a second ball screw 316 which threadingly engages a ball nut 318 attached to a second tubular extension shaft 320. The opposite end of the shaft 320 is connected to a rotatable shaft 322 mounted in a bearing 324 which is connected to the C pillar vertical drive mechanism.

Activation of the drive motors 306 and 314, which will correspond to a simultaneous energization of the corresponding drive motors on the opposite side of the roof structure 210, will cause an extension or retraction of the overall longitudinal length of the entire roof 210 depending upon the direction of rotation of the ball screws associated with the drive motors 306 and 314. During such extension or retraction, the roof panels 270, 272, 274 and 276 will be brought together in a closer overlapping relationship or driven longitudinally apart to increase the overall length of the roof 210. However, during all such displacements, each roof panel 270, 272, 274 and 276 will always have an overlapped position with adjacent panels to provide a solid exterior surface for the roof 210.

Further, rotation of the shaft 222 by the drive motor 260 will rotate the pivot block 228 and cause a change in the angle of the extension 238. This enables the width and length of the roof 210 and the angle of the A and C pillars to be varied as desired.

Simultaneously, the pivotal connection of the bearings 244 and 324 to the A and C pillar drive mechanisms in conjunction with the corresponding bearings on the opposite side of the roof panel 210 maintains the roof panel 210 in a level position during such extension and retraction movements as well as during vertical up and down movements of the roof 210.

Figure 8:
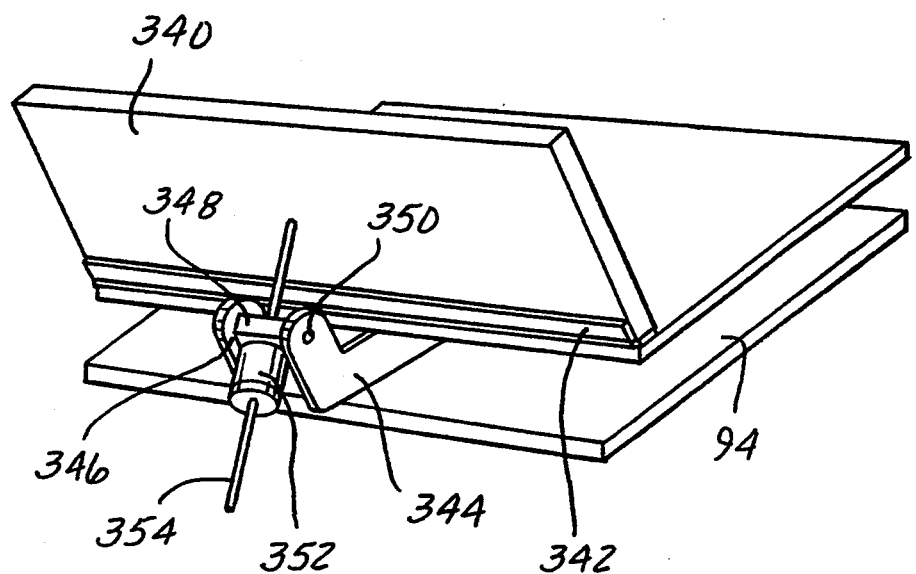
FIG. 8 is a partial, perspective view showing the toe plate positioning mechanism of the programmable vehicle model.

Various internal structures are also movable in the programmable vehicle model 10. FIG. 8 depicts the structure of an adjustable toe plate which is attached to each of the longitudinally movable floor pan support plates 94 and 100. As both toe plates are identical, only one will be described hereafter.

As shown in FIG. 8, a planar toe plate 340 is pivotally mounted by means of a hinge 342 to the floor pan plate 94 which is movably mounted on the cross car carriage plate 68 as described above. A pair of spaced arms 344 and 346 are attached at one end to the bottom surface of the floor pan support plate 94 and extend outward beyond one edge of the floor pan support plate 94. The arms 344 and 346 pivotally support a block 348 mounted therebetween by means of a pivot 350. A bi-directional electric motor 352 reciprocatingly drives a threaded shaft 354. The threaded shaft 354 engages one surface of the toe plate 340 and, upon extension or retraction of the shaft 354 with respect to the motor 352, causes a resulting tilting or change in the angular disposition of the toe plate 340 with respect to the floor pan 94.

Figure 9:
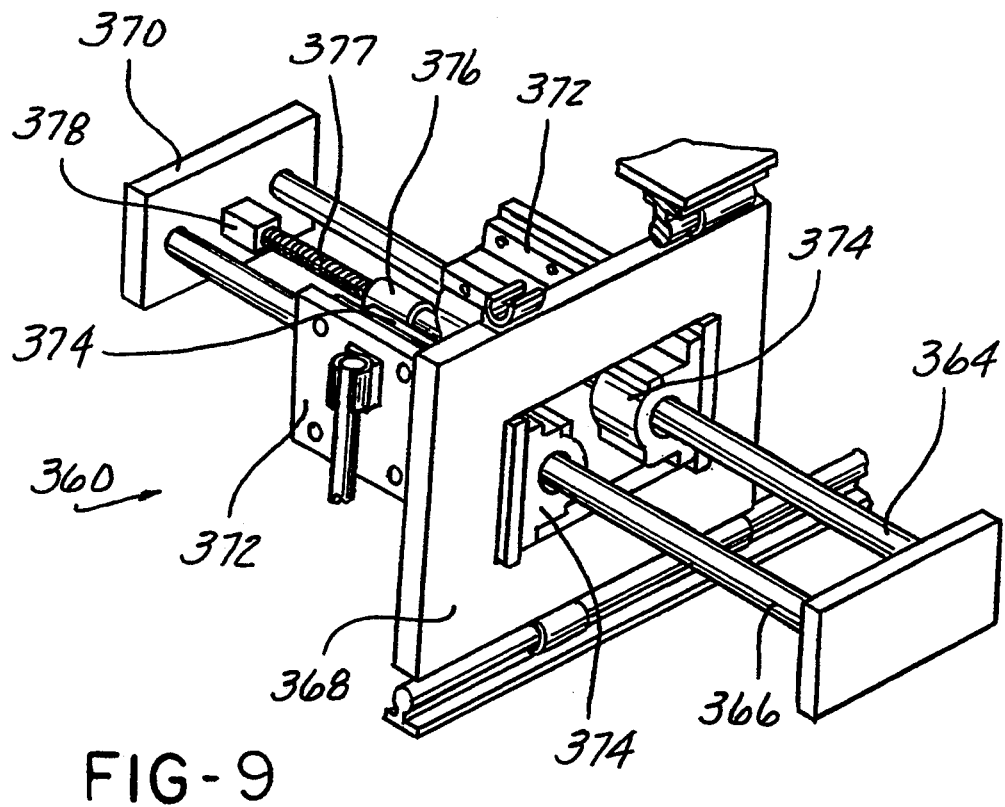
FIG. 9 is a perspective view showing the accelerator/brake pedal positioning mechanism of the present invention.

The accelerator and/or brake pedals within the programmable vehicle model 10 are also adjustable in vertical, horizontal and cross car directions. As shown in FIG. 9, a pedal positional mounting structure is illustrated. The pedal positional mounting structure 360 is attached to the front clip support 120 shown in FIG. 4 and has conventional accelerator and brake pedals, not shown, pivotally mounted on a first plate 362. A pair of spaced shafts 364 and 366 extend from the first plate 362 through an aperture 367 in a mounting plate 368 to a second plate 370. A pair of blocks 372 are mounted to one side of the mounting plate 368 and support bearings 374 which slidably receive the shafts 364 and 366. An electric drive motor 376 is attached at one end to the mounting plate 368 and has a ball screw 377 extending outward therefrom toward the second plate 370. A ball nut 378 is fixedly mounted to the second plate 370 and threadingly engages the ball screw 377. Rotation of the ball screw 377 upon activation of the motor 376 will cause a corresponding movement in the position of the second plate 370 with respect to the mounting plate 368 and through the shafts 364 and 366 cause the first plate carrying the accelerator and/or brake pedals to correspondingly move away from or toward the mounting plate 368 thereby changing the fore and aft position of the accelerator and/or brake pedals within the interior of the programmable vehicle model 10. Additional motors, not shown, are attached to the front clip support structure 120 and engage the blocks 372 to provide up/down positioning of the pedals. The mounting plate 368 and the blocks 372 carry bearings which slide along linear rails on the support structure 120 for such variable positioning. Cross car positioning of the pedals is achieved by movement of the main cross car plates as described above.

A positioning mechanism similar to that shown in FIG. 9 is also provided to provide fore/aft, up/down and cross car positioning of the steering column.

Figure 10:
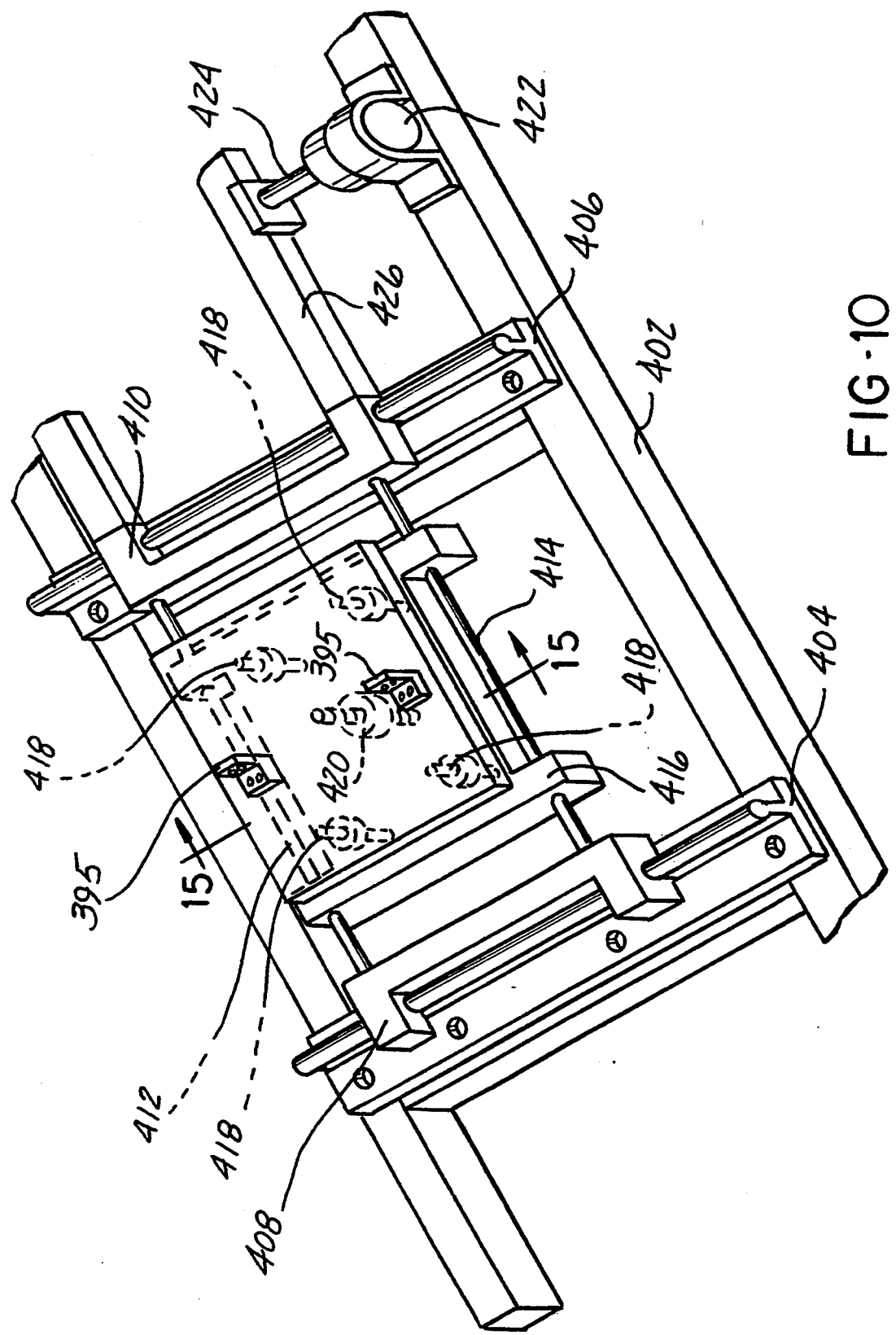
FIG. 10 is a partial, perspective view showing the instrument panel positioning mechanism of the present invention.
Figure 15:
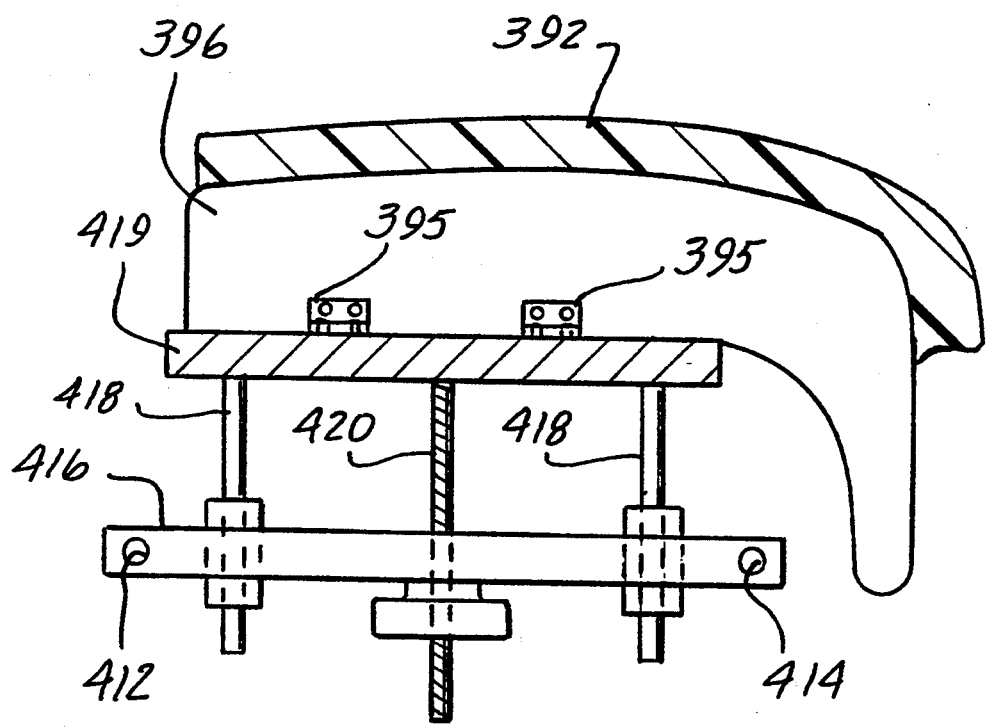
FIG. 15 is a cross sectional view taken along line 15—15 in FIG. 10.
Figure 16:
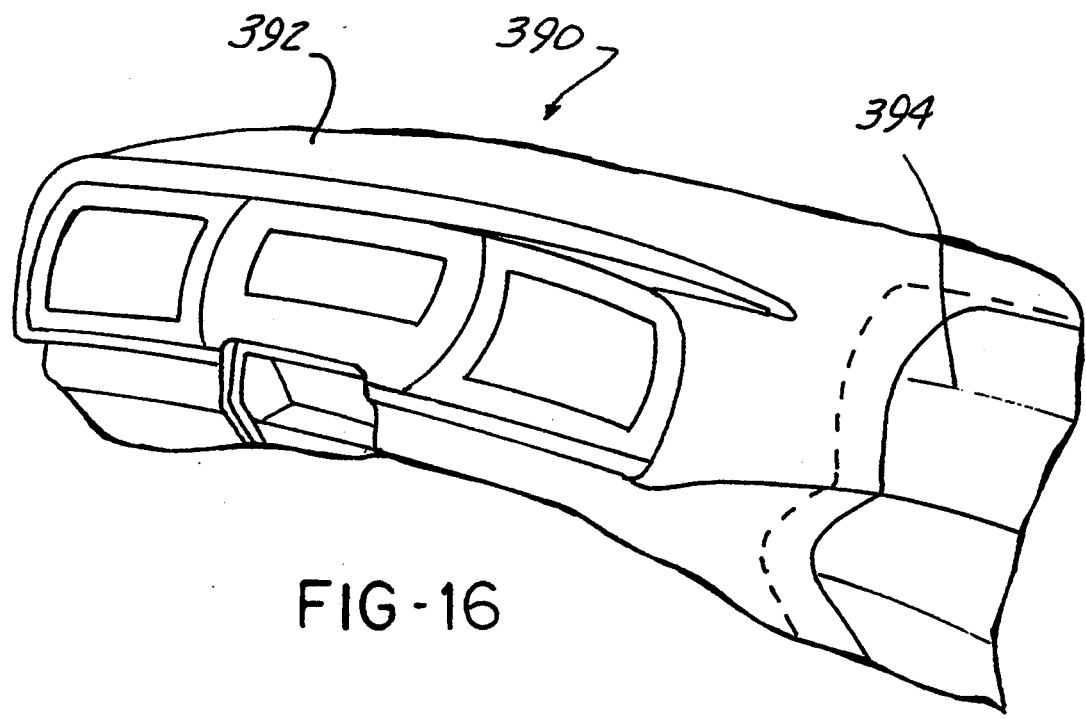
FIG. 16 is a perspective view of the two-piece telescoping instrument panel of the programmable vehicle model.

FIGS. 10, 15 and 16 depict a positional mounting structure for the instrument panel 390 of the programmable vehicle model 10. The instrument panel positional mounting arrangement is provided in two substantially identical assemblies, one for the instrument panel section 392 on the driver's side of the programmable vehicle model 10 and the other for the passenger side instrument panel section 394. The sections 392 and 394 overlap as shown in FIG. 16 and are each separately movable fore/aft, up/down and laterally cross car.

As shown in FIGS. 10 and 15, a pair of spaced rails 400 and 402 are mounted to the front clip support structure 120. A pair of spaced linear guide rails 404 and 406 extend across the rails 400 and 402. A mounting bracket 408 and 410 is slidably mounted on each of the linear rails 404 and 406, respectively. A pair of cross shafts 412 and 414 extend between the brackets 408 and 410. A first support plate 416 is slidably mounted on the shafts 412 and 414 for cross car positioning of the associated instrument panel section 392 during movement of the front clip plate as described above. A plurality of mounting posts 418 extend outward from the support plate 416 and engage a second spaced plate 419. The mounting posts 418 are slidably mounted in the plate 416 through bushings mounted in the plate 416. An electric motor controlled jack screw 420 is also mounted in the plate 416 and engages the second plate 419 at one end. Brackets 395 attach a template on blade 396 to the second plate 419. The blade 396 is in the form of a thin plate having the shape of and joined to the instrument panel section 392.

Activation of the jack screw 420 will cause the position of the instrument panel section 392 to be varied depending upon the amount and direction of rotation of the jack screw 420. A bi-directional electric motor 422 is mounted on the rail 402 and has an output shaft 424 which engages a rail 426 for controlling the fore/aft position of the interconnected brackets 408 and 410. A similar structure is provided for the other telescopingly arranged instrument panel section 394 to provide varying degrees of overlap in a cross car direction of the two instrument panel sections 392 and 394.

Figure 11:
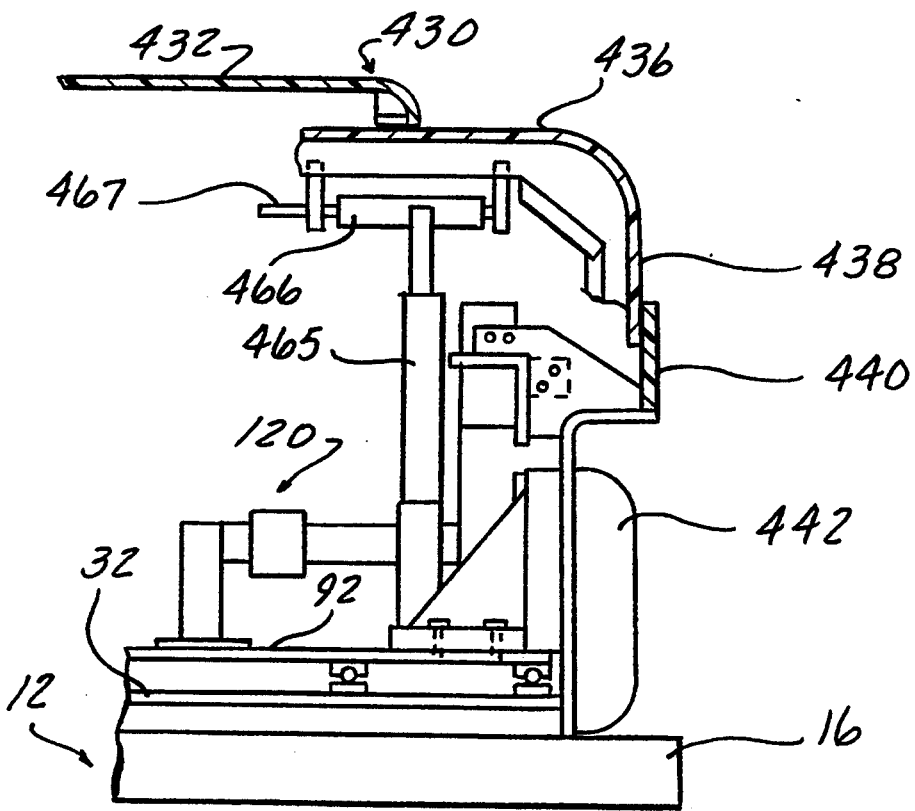
FIG. 11 is a partially cross sectioned view of a portion of the hood of the programmable vehicle model.
Figure 12:
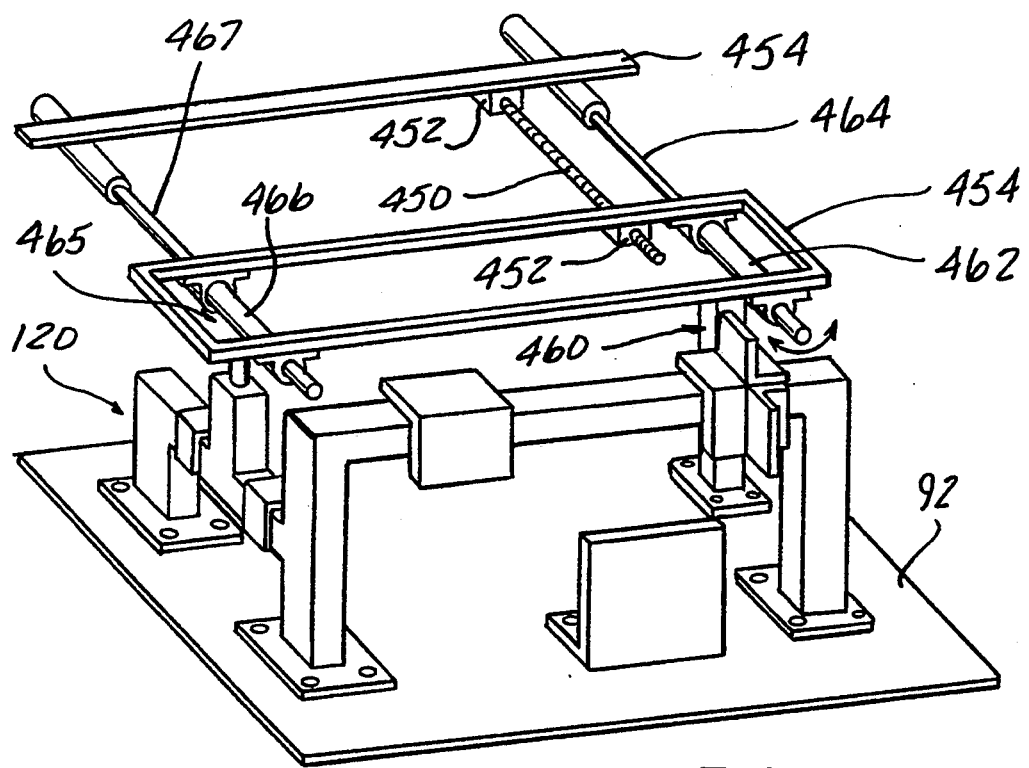
FIG. 12 is a perspective view showing the hood tilt mechanism of the programmable vehicle model.
Figure 17:
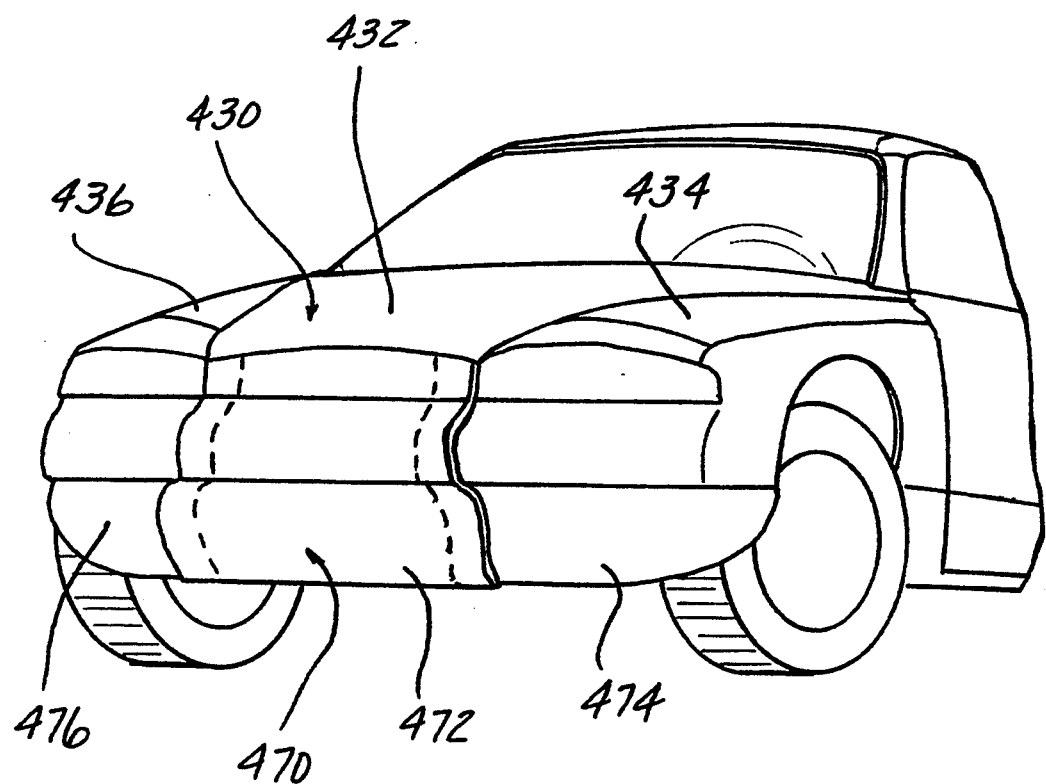
FIG. 17 is a perspective view of the front end of the programmable vehicle model showing the three-piece hood and front facia.

FIGS. 11, 12 and 17 depict the positional mounting of the hood 430 of the programmable vehicle model 10. The hood 430 is formed of three sections comprising a central section 432 and opposed side sections 434 and 436. As shown in FIG. 11, each side section, such as side section 436 of the hood 430 curves downwardly from a horizontal portion which is disposed in an overlapping relationship with one side edge of the central hood portion 432. The lower edge 438 of the side section 436 telescopes within a vertical section of a fender 440 of the programmable vehicle model 10. As shown in FIG. 11, the fender 440 is mounted to the front clip support structure 120 by suitable brackets and extends above a wheel 442 which is also attached to the front clip support structure 120.

As shown in FIG. 12, the hood 430 may also be tilted downward from the cowl portion toward the front facia or bumper 470 and raised or lowered vertically. A ball screw shaft 450 extends between bearings 452 attached to support frames or members 454 supporting the three sections 432, 434 and 436 of the hood 430. The shaft 450 provides lateral or cross car alignment of the three hood sections 432, 434 and 436. A drive motor 460 mounted to the front clip support structure 120 engages and vertically displaces a cylinder 462 mounted about a laterally extending, rotatable shaft 464 extending across the entire hood 430. A similar drive motor and rotatable shaft is mounted on the opposed front clip support structure. Likewise, a pair of drive motors, one of which is denoted by reference number 465 in FIG. 12, engages and vertically displaces a front located cylinder 466 which engages a rotatable shaft 467 extending across the front portion of the frame or support members 454. In this manner, selective activation of the front located motors 465 or the rear located motors 460 can result in a tilting or pivotal movement of the programmable vehicle model hood 430. Of course, both sets of motors 460 and 465 can be activated in unison and in the same direction of output shaft rotation to cause a vertical displacement of the entire hood 430 in which all three hood sections 432, 434 and 436 are vertically displaced by the same amount of displacement.

The front facia or bumper 470 shown in detail in FIG. 17 is also formed of three independently movable sections including a central section 472 movable in fore and aft, and up and down directions only and two outer side sections 474 and 476 which are movable fore/aft, up/-down and also cross car. The three different axis movements of the front facia sections 472, 474 and 476 are controlled by the front clip plates on which the support structure 120 carrying the front facia sections is mounted. During cross car movements, the center section 472 remains stationary, while the two side sections 474 and 476 move inboard or outboard from a center position shown by the phantom lines. However, during such movements, the three front facia sections 472, 474 and 476 remain overlapped to provide a solid exterior appearance. A similar three-piece movable structure is also provided for the trunk of the programmable vehicle model 10.

All of the electric motors controlling the up/down, fore/aft, cross car and tilt movements of the various components of the programmable vehicle model 10 are electrically connected to a control means denoted generally by reference number 500 in FIG. 1. The control means 500 is preferably a computer having a central processing unit which executes a control program stored in a memory. The computer may be any personal or microcomputer or a special purpose computer, such as a 147 MVME sold by Motorola. As is conventional, the control means 500 includes a keyboard 502 and a display or monitor 504.

The control program is set up to count the number of rotations of each motor from a center or home position and to correlate the number of rotations to distance, such as distance amounts measured in millimeters from a center home position established for each motor. In a preferred embodiment, most of the motors on the programmable vehicle model 10 are stepper motors with the control means 500 controlling the amount and direction of rotation of the output shaft or ball screw of each stepper motor. As in conventional, the control means 500 activates a stepper motor driver which generates appropriate control signals to each motor to control the duration and direction of rotation of the output shaft of each stepper motor. Although a single stepper motor driver may be provided for each separate motor, due to the large number of motors employed in a preferred configuration of the programmable vehicle model 10, a multiplexed stepper motor control arrangement is provided for the programmable vehicle model 10. In this multiplexer control, each stepper motor is multiplexed to drive each of a plurality of different stepper motors, one at a time, under the control of the control means 500. The multiplexer control apparatus and the stepper motor drivers themselves may be housed entirely within the programmable vehicle model 10, such as within the interior of the trunk and/or engine compartment of the programmable vehicle model 10. Further details of the construction and operation of the multiplexed stepper control apparatus may be had by referring to co-pending U.S. patent application Ser. No. 07/786,881, the contents of which are incorporated herein in their entirety.

The control means 500 also controls the friction brake associated with each motor which functions to lock the ball screw associated with each motor in a fixed position. This is essential during opening and closing of the programmable vehicle model doors, for example, such that the two telescoping door panels remain in the desired fixed position during such pivotal opening and closing movements. Such locking engagement of associated panels is also required for the programmable vehicle model roof 210 in which pairs of roof panels are locked together for fore/aft or cross car movements.

Figure 13:
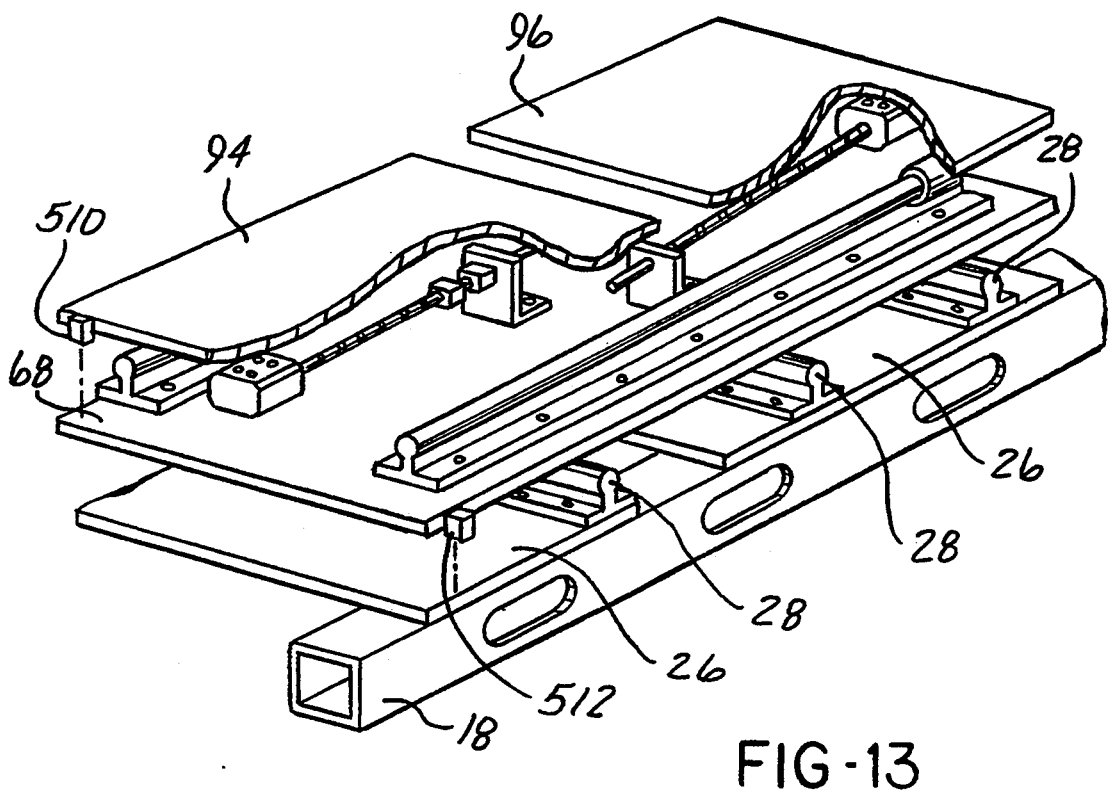
FIG. 13 is a partial, perspective view showing a side portion of the platform, the cross car and the fore/aft carriages of the programmable vehicle model.

Further, as shown in FIG. 13, center position and overtravel sensors are associated with each movable cross car, fore/aft and up and down component of the programmable vehicle model 10. Such sensors are provided for each motor and are typically mounted on the member moved or controlled by each motor. Any suitable sensor means may be employed in the present invention. As shown in FIG. 13, for example, two sensors 510 and 512 are respectively mounted on one edge of the front floor pan fore/aft plate 94 and the front floor pan cross car support plate 68. Such sensors, such as a photoelectric sensor sold by Allen Bradley as Model No. 42SMP-7021 are settable so as to detect the presence of an object or surface at a pre-settable distance. Thus, the sensor 510 may be set to detect when the edge of the front floor pan plate 94 reaches the outer edge of the underlying front floor pan cross car plate 68 thereby indicating an end of travel position and to prevent the bearings on the plate 94 from sliding off of the linear rails 28. The sensor 512 functions in the same manner to detect the edge of the support plate 26 thereby indicating a cross car end of travel outboard limit position. Other sensors are also associated with each motor or motor controlled component to indicate its home or center position. This center position represents the full retracted position for the element or component controlled by each motor.

This position would be represented by a 0.0 current position as described hereafter for each element and/or controllable motor. Activation of a particular motor which results in rotation of its associated ball screw will drive the component or element controlled by the motor a predetermined distance by the control means 500. The control means 500 will calculate the current position of each element by counting the rotations of the ball screw of the associated motor and converting the number of rotations to a corresponding distance.

The center position and actual distance or location of each component resulting from a selected amount of rotation of the associated drive motor is used by the control means 500 in several different ways to control the programmable vehicle model 10. In a first mode of operation, with all of the components of the programmable vehicle model 10 in their center or home position thereby having a current position of 0.0, any axis or element of the programmable vehicle model 10 may be called up on the monitor 510 by viewing a menu which is displayed by the control program executed by the control means 500. This menu lists each controllable element of the programmable vehicle model 10 along with each controllable direction of movement, such as up/down, fore/aft, cross car or tilt. The operator by entering appropriate commands through the keyboard 502 can then move a particular axis or component either a predetermined distance by entering the desired end position or by jogging the particular motor and advancing the associated component driven by the motor to the desired position. Other axes or components can then be consecutively called up via the menu to position other components of the programmable vehicle model 10.

A single or double axis joy stick may also be connected to the control means 500 and provided with thumbwheels for selecting an axis or component for displacement. Movement of the joy stick in any direction will input signals to the control means 500 which will then move the designated component in the direction and distance provided by the joy stick.

It will be understood that certain components of the programmable vehicle model 10 move in conjunction with each other, such as the main cross car carriage outer plate members, two of the roof panels during fore/aft or cross car movements, all four A and C pillar drive motors during vertical displacement of the programmable vehicle model roof 210, both front or rear doors during extension or retraction of the length of the programmable vehicle model 10, etc. These simultaneous operations are executed by the control means 500 and are programmed in the control program.

When the operator has the programmable vehicle model 10 positioned in a desired configuration or dimensional arrangement, the operator can direct the control means 500 to store the positional coordinates of each motor and/or controlled element of the programmable vehicle model 10. This information is stored in the memory of the control means 500 and may be recalled via an appropriate menu on the display 504 so as to enable the programmable vehicle model 10 to be repositioned in any of the previously stored positional arrangements. This also affords the opportunity to store dimensional coordinates associated with a particular vehicle model or manufacture and thereby enable the programmable vehicle model 10 to simulate any vehicle model.

The programmable vehicle model 10 includes various exterior body panels, as described above. Such panels, such as the two overlapping door panels 520 and 522 in FIG. 1, may be formed of any suitable material, such as a metal, plastic, etc. In a preferred embodiment, the various exterior body panels of the programmable vehicle model 10 are formed of carbon fiber which is molded to the desired shape. Aluminum blades are attached by suitable fasteners, adhesive, etc., to the interior surfaces of each exterior body panel and via dowel pins and bolts to the internal support structure of the programmable vehicle model 10.

What is claimed is:

1. A vehicle model comprising:
a platform;
panel support means mounted on the platform;
a plurality of vehicle body panels mounted on the panel support means in vehicle body positions simulating a vehicle;
at least certain of the vehicle body panels formed of first and second panel sections mounted in overlapping, telescopingly adjustable positional relationship;
drive means, coacting with the at least certain first and second panel sections, for adjustably positioning the first and second panel sections with respect to each other at an adjustably selectable position to vary at least one of a height, width and length of the vehicle body panel formed of the first and second panel sections; and
control means having a central processing unit executing a control program stored in a memory;
the control means controlling the operation of the drive means to control telescoping displacement of the first and second panel sections of each vehicle body panel.

2. The vehicle model of claim 1 wherein the first and second panel sections of the at least certain vehicle body panels have a predetermined amount of overlap such that the first and second panel sections present a solid exterior surface in any telescopingly selectable position of the first and second panel sections.

3. The vehicle model of claim 1 wherein the drive means comprises:
a bi-directional, electrical stepper motor;
a ball screw extending from and rotated by the motor; and
a ball nut threadingly engaging the ball screw and attached to one of the first and second panel sections for moving the one of the first and second panel sections.

4. The vehicle model of claim 1 further comprising:
a pair of first plates slidably mounted on the platform on opposite sides of a longitudinal axis of the platform;
the drive means including first drive means for bi-directionally driving the pair of first plates to adjustably selectable transverse positions on opposite sides of the longitudinal axis of the platform;
a second plate slidably mounted on each of the pair of first plates for longitudinal movement thereon parallel to the longitudinal axis of the platform;
the drive means further including second drive means coupled between each of the pair of first plates and the second plate mounted respectively thereon for driving the second plate to an adjustably selectable longitudinal position along each respective first plate; and
the panel support means being mounted on the second plate on each of the pair of first plates for supporting a first vehicle body panel of the plurality of vehicle body panels on the second plate.

5. The vehicle model of claim 4 wherein:
the first vehicle body panel includes a third panel section; and
the panel support means includes first, second and third panel support means;
the first panel support means supporting the first panel section on the second plate of one of the pair of first plates;
the second panel support means supporting the second panel section on the second plate of the other of the pair of first plates; and
the third panel support means, mounted to and extending between the first and second panel support means, for supporting the third panel section between the first and second panel sections;
the first and second panel sections disposed in telescoping, overlapped relationship with respect to the third panel section and bi-directionally movable by the first drive means transversely on opposite sides of the third panel section.

6. The vehicle model of claim 5 further including:
angle means, mounted on the platform, for selectively adjusting the angle of the first, second and third panel sections, as a unit, between a first end and a second end thereof with respect to the longitudinal axis of the platform.

7. The vehicle model of claim 6 wherein the angle means comprises:
a first bar supporting the first ends of the first, second and third panel sections;
a second bar spaced from the first bar and supporting the second, opposed ends of the first, second and third panel sections; and
separate angle drive means, coupled respectively to the first and second bars, for selectively adjusting the height of each of the first and second bars, independent of each other, with respect to the platform.

8. The vehicle model of claim 1 further comprising:
a first pair of first plates slidably mounted on the platform on opposite sides of the longitudinal axis of the platform;
the drive means bi-directionally driving the first pair of first plates to adjustably selectable transverse positions on opposite sides of the longitudinal axis of the platform;
a second pair of first plates slidably mounted on the platform on opposite sides of the longitudinal axis of the platform and spaced longitudinally from the first pair of first plates;
the drive means bi-directionally driving the second pair of first plates to adjustably selectable transverse positions on opposite sides of the longitudinal axis of the platform;
a second plate mounted on each of the first pair of first plates for longitudinal movement with respect thereto;
a first vertically extending pillar fixedly mounted on each of the second plates;
a second vertically extending pillar fixedly mounted on each of the second pair of first plates;
the drive means, coupled to the second plates having the first pillar mounted thereon and the associated one of the first pair of first plates, for selectively adjusting the longitudinal position of the first pillar with respect to the second pillar; and
the vehicle body panels include a simulated vehicle door formed of a first door panel section and a second door panel section, the first and second door panel sections being mounted between the first and second pillars and telescopingly overlapping at one edge to present a solid exterior surface at any selected adjustable position of the first and second door panel sections.

9. The vehicle model of claim 8 wherein the first and second pillars form a vehicle door opening therebetween.

10. The vehicle model of claim 9 wherein:
means for telescopingly supporting the first and second door panel sections;
the supporting means being pivotally mounted at one end on the first pillar and movable longitudinally therewith; and
an opposite end of the supporting means being releasably lockable to the second pillar when the supporting means and the first and second door panel sections mounted thereon are in a position closing the vehicle door opening.

11. The vehicle model of claim 10 further comprising:
an aperture formed in the first door panel section;
an armrest movably extending through the aperture in the first door panel section; and means, mounted on the supporting means, for selectively adjusting the vertical and horizontal position of the armrest with respect to the first door panel section.

12. The vehicle model of claim 11 wherein the armrest position adjusting means comprises:
a pair of horizontally extending spaced rails mounted on the supporting means;
a first horizontally movable member slidably mounted on each horizontal rail;
a pair of spaced rails vertically extending between and fixed to each first horizontally movable member;
a first vertical movement control member slidably mounted on the vertically extending rails, the armrest mounted on the first vertical movement control member;
first vertical drive means, coupled between one of the first horizontally movable members and the first vertical movement control member, for selectively adjusting the vertical position of the vertical control member and the armrest mounted thereon with respect to the first door panel section; and
first horizontal drive means, coupled between the first door panel section and the first vertical movement control member, for selectively adjusting the horizontal position of the first vertical movement control member and the armrest mounted thereon with respect to the first door panel section.

13. The vehicle model of claim 12 further comprising:
a simulated window regulator;
a second aperture formed in the first door panel section, the simulated window regulator movably extending through the second aperture;
a second horizontally movable member slidably mounted on each of the horizontally extending rails;
a second vertical movement control member slidably mounted on the horizontally extending rails and vertically extending between and joined to the second horizontally movable member;
second vertical drive means, coupled between one of the second horizontally movable members and the second vertical movement control member, for selectively adjusting the vertical position of the second vertical movement control member and the simulated window regulator mounted therein with respect to the first door panel section; and
second horizontal drive means, coupled between the first door panel section and the second vertical movement control member, for selectively adjusting the horizontal position of the second vertical control member and the simulated window regulator mounted thereon with respect to the first door panel section.

14. The vehicle model of claim 8 further comprising:
at least one third plate slidably mounted on the platform between the second pair of first plates and spaced laterally from the longitudinal axis of the platform;
the drive means, mounted on the platform and connected to the at least one third plate, for selectively adjusting the lateral position of the third plate with respect to the longitudinal axis of the platform;
at least one fourth plate slidably mounted on the third plate for longitudinal movement with respect to the third plate;

the drive means, coupled between the at least one third and fourth plates, for selectively adjusting the longitudinal position of the fourth plate with respect to the third plate; and a seat mounted on the fourth plate.

15. The vehicle model of claim 14 further comprising:

a pair of fourth plates mounted on the third plate, the pair of fourth plates being adjustably positionable longitudinally with respect to each other on the third plate; and the drive means including a pair of independently operable drive means, each mounted between one of the pairs of fourth plates and the third plate, for selectively adjusting the longitudinal position of each of the fourth plates with respect to each other.

16. The vehicle model of claim 15 wherein one of the fourth plates further comprises:

a toe plate pivotally mounted at one end of the one of the fourth plates; and toe plate drive means, coupled between the toe plate and the one of the fourth plates, for selectively adjusting the angle between the toe plate and the one of the fourth plates.

17. The vehicle model of claim 15 further comprising:

a pedal;

a pedal support plate, the pedal mounted on the pedal support plate and spaced vertically from the pair of fourth plates; and pedal adjustment means, mounted on the one of the first pair of first plates, for selectively adjusting the longitudinal, vertical and lateral position of the pedal support plate with respect to the pair of fourth plates.

18. The vehicle model of claim 17 wherein the pedal adjustment means comprises:

a back plate;

at least one rod connected between the back plate and the pedal support plate;

a pedal position control plate having an aperture formed therein, the at least one rod extending through the aperture;

longitudinal pedal drive means coupled between the back plate and the pedal position control plate for selectively adjusting the longitudinal position of the back plate and the pedal support plate connected thereto with respect to the pedal position control plate;

means for slidably mounting the position control plate on the panel support means;

vertical pedal drive means, coupled between the panel support means and the at least one rod, for selectively adjusting the vertical position of the at least one rod, and the pedal support plate attached thereto, with respect to the platform; and lateral pedal drive means, mounted between the pedal position control plate and the panel support means, for selectively adjusting the lateral position of the pedal position control plate with respect to the longitudinal axis of the platform.

19. The vehicle model of claim 8 further comprising:

a simulated vehicle dashboard formed of first and second dashboard sections telescopingly overlapped at an intermediate end portion between an outer end of each of the first and second dashboard sections;

first lateral means for movably attaching the first dashboard section to one of the first vertical pillars for lateral and longitudinal movement of the first dashboard section with the one of the first vertical pillars;

second lateral means for movably attaching the second dashboard section to the other of the first vertical pillars for lateral and longitudinal movement of the second dashboard section with the other of the first vertical pillars;

means, mounted on the first lateral means, for adjusting the vertical position of the first dashboard section with respect to the platform; and means, mounted on the second lateral means, for adjusting the vertical position of the second dashboard section with respect to the platform.

20. The vehicle model of claim 8 further comprising:

a third pair of first plates mounted on the platform and spaced from the first and second pair of first plates;

a third pair of second plates, one of which is slidably mounted on each of the third pair of first plates;

a third pair of vertically extending pillars, each mounted on one of the third pair of second plates;

a first pair of upper pillar members, each pivotally mounted on the one of first pillars and extending upward therefrom;

a second pair of upper pillar members, each pivotally mounted on one of the second pillars and extending upward therefrom;

a third pair of upper pillar members, each pivotally mounted on one of the third pillars and extending upward therefrom; and a vehicle roof comprising:

a first pair of frontmost roof panels extending between and rearward from the first pair of upper pillar members, the pair of frontmost roof panels disposed in a telescoping, overlapping, transverse arrangement with respect to each other;

a second pair of rearmost roof panels disposed between and rearward of the first pair of frontmost roof panels, the second pair of rearmost roof panels disposed in a telescoping, overlapping, transverse arrangement with respect to each other;

the first and second pairs of roof panels disposed in a telescoping, overlapping, longitudinal arrangement with respect to each other and forming a selectably positionable, variably dimensional, vehicle roof;

first roof panel drive means, mounted between each of the first pair of frontmost roof panels, for selectively adjusting the transverse position of the first pair of frontmost roof panels with respect to each other;

second roof panel drive means, mounted between each of the second pair of rearmost roof panels, for selectively adjusting the transverse position of the second rearmost roof panels with respect to each other;

third roof panel drive means, connected to and extending between one of the pair of frontmost roof panels and one of the pair of rearmost roof panels and between the other of the frontmost pair of roof panels and the other of the pair of rearmost roof panels, for selectively varying the longitudinal position of the first pair of frontmost roof panels with respect to the second pair of rearmost roof panels;

vertical roof panel drive means, mounted in each of the pairs of first, second and third upper pillar members and first, second and third pillar members, for selectively adjusting the vertical position of the first and second pairs of roof panels with respect to the platform; and means for pivotally coupling the vertical roof panel drive means to the first and second pairs of roof panels.

21. The vehicle model of claim 20 further comprising:
upper pillar drive means, mounted in each of the pairs of first, second and third upper pillar members, for selectively varying the length of each of the pairs of first, second and third upper pillar members with respect to the associated first, second and third pillar members;
first pivot means, mounted on one end of each of the upper pillar drive means, for pivotally connecting the one end of each of the upper pillar drive means to the third roof panel drive means mounted on the first and second pairs of roof panels; and
second pivot means, mounted on the other end of each of the upper pillar drive means, for pivotally connecting the other end of each of the upper pillar drive means to the vertical roof panel drive means.

22. The vehicle model of claim 21 further comprising:
means for selectively adjusting the angle of each of the first, second and third upper pillar members with respect to the associated vertical roof panel drive means.

23. The vehicle model of claim 22 wherein the angle adjusting means comprises:
a spline shaft connected between the second pivot means and the vertical roof panel drive means;
a spline nut engaged with the spline shaft and slidable therealong; and
angle adjusting drive means, coupled to the spline nut, for selectively rotating the spline nut and the spline shaft to vary the angular position of the second pivot means with respect to the associated first, second and third upper pillar members.

24. The vehicle model of claim 20 further comprising:
a frame mounted on a vehicle interior side of each of the first and second pairs of roof panels; and
the first and second roof panel drive means being coupled between the frames of the first pair of roof panels and the second pair of roof panels, respectively.

25. The vehicle model of claim 24 wherein the third roof panel drive means comprises:
a first pair of drive motors mounted to and extending oppositely from one end of one of the second upper pillar members;
a second pair of drive motors mounted to and extending oppositely from one end of the other of the second upper pillar members; and
a ball screw driven by each of the first and second pairs of drive motors threadingly engaging a ball nut fixedly mounted to one of the frames on one of the first and second roof panels.

26. The vehicle model of claim 8 further comprising:
a third pair of first plates mounted on the platform and spaced from the first and second pair of first plates;
a third pair of second plates, one of which is slidably mounted on each of the third pair of first plates;
a third pair of vertically extending pillars, each mounted on one of the third pair of second plates;

a first pair of upper pillar members, each pivotally mounted on one of the first pillars and extending upward therefrom;
a third pair of upper pillar members, each pivotally mounted on one of the third pillars and extending upward therefrom; and
a vehicle roof comprising:
a first pair of frontmost roof panels extending between and rearward from the first pair of upper pillar members, the pair of frontmost roof panels disposed in a telescoping, overlapping, transverse arrangement with respect to each other;
a second pair of rearmost roof panels disposed between and rearward of the first pair of frontmost roof panels, the second pair of rearmost roof panels disposed in a telescoping, overlapping, transverse arrangement with respect to each other;
the first and second pairs of roof panels disposed in a telescoping, overlapping, longitudinal arrangement with respect to each other and forming a selectably positionable, variably dimensional, vehicle roof;
means for slidably connecting the first pair of frontmost roof panels for transverse movement with respect to each other;
means for slidably connecting the second pair of rearmost roof panels for transverse movement with respect to each other; and
means for slidably connecting the first and second pairs of roof panels for longitudinal movement with respect to each pair of the first and second pairs of roof panels.

27. The vehicle model of claim 3 further comprising:
means for determining the actual travel position of each ball screw with respect to a predetermined reference position.

28. The vehicle model of claim 4 further comprising:
sensor means, mounted on certain of the first and second plates, for sensing the extreme bi-directional travel positions of the first and second plates with respect to at least one of each other and the platform, the sensor means being input to the control means.

29. A vehicle model comprising:
a platform;
a plurality of pairs of first plates slidably disposed longitudinally along the platform, each first plate of each pair of first plates being disposed equidistantly on opposite sides of a longitudinal axis of the platform;
first drive means, coupled between the platform and at least certain of the pairs of first plates, for bi-directionally driving the at least certain of the pairs of first plates to adjustably selectable, transverse positions with respect to the longitudinal axis of the platform;
a plurality of pairs of second plates, at least one pair of the plurality of pairs of second plates slidably mounted on one pair of first plates, with at least one of the second plates being disposed on a first plate of each pair of first and second plates;
second drive means, coupled between one of the first plates and one of the second plates of each pair of first and second plates, for bi-directionally driving the second plate to an adjustably selectable longitudinal position with respect to the associated first plate;

panel support members mounted on certain of the pairs of second plates;

a plurality of vehicle body panels mounted on the panel support members in a vehicle body position simulating at least a portion of a vehicle;

certain of the vehicle body panels disposed in a telescopingly adjustable, overlapped arrangement with adjacent vehicle body panels to form a solid exterior surface in all telescoping positions of the vehicle body panels; and control means, having a central processing unit executing a control program stored in a memory, for controlling the operation of the first and second drive means to selectively adjust the telescoping displacement of the vehicle body panels with respect to each other.

30. The vehicle model of claim 29 further comprising:

means for sensing the actual position of at least certain of the vehicle body panels, an output of each sensing means being input to the central processing unit; and the central processing unit including control program means for storing the sensed actual position of each vehicle body panel corresponding to a predetermined configuration of the vehicle model and for recalling the stored actual position of each vehicle body panel corresponding to the predetermined configuration of the vehicle model to reconfigure the vehicle model into the predetermined vehicle configuration.

31. The vehicle model of claim 29 further comprising:

a plurality of pairs of vertically extending pillars, each mounted on certain ones of the first and second plates;

first, second and third pairs of upper pillar members, each pivotally mounted on one of the pillars and extending upward therefrom; and a vehicle roof comprising:
  a first pair of frontmost roof panels extending between and rearward from a frontmost pair of the upper pillar members, the pair of frontmost roof panels disposed in a telescoping, overlapping, transverse arrangement with respect to each other;
  a second pair of rearmost roof panels disposed between and rearward of the first pair of frontmost roof panels, the second pair of rearmost roof panels disposed in a telescoping, overlapping, transverse arrangement with respect to each other;
  the first and second pairs of roof panels disposed in a telescoping, overlapping, longitudinal arrangement with respect to each other and forming a selectably positionable, variably dimensional, vehicle roof;
  means for slidably connecting the first pair of roof panels for transverse movement with respect to each other;
  means for slidably connecting the second pair of roof panels for transverse movement with respect to each other; and
  means for slidably connecting the first and second pairs of roof panels for longitudinal movement with respect to each pair of the first and second pairs of roof panels.

32. The vehicle model of claim 31 further comprising:

first roof panel drive means, mounted between each of the pair of frontmost roof panels, for selectively adjusting the transverse position of the first pair of frontmost roof panels with respect to each other;

second roof panel drive means, mounted between each of the second pairs of rearmost roof panels, for selectively adjusting the transverse position of the first and second rearmost roof panels with respect to each other; and third roof panel drive means, connected to and extending between one of the pair of frontmost roof panels and one of the pair of rearmost roof panels and between the other of the pair of frontmost roof panels and the other of the pair of rearmost roof panels, for selectively varying the longitudinal position of the frontmost pair of roof panels with respect to the pair of rearmost roof panels.

33. The vehicle model of claim 32 further comprising:

vertical roof panel drive means, mounted in each of the first, second and third pairs of upper pillars and connected to each of the first and second pairs of roof panels, for selectively adjusting the vertical position of the first and second pairs of roof panels with respect to the platform; and means for pivotally coupling the vertical roof panel drive means to the first and second pairs of roof panels.

34. The vehicle model of claim 33 further comprising:

upper pillar drive means mounted in each of the first, second and third pairs of upper pillar members, for selectively varying the length of each of the first, second and third pairs of upper pillar members;

first pivot means, mounted on one end of each of the upper pillar drive means, for pivotally connecting the one end of each of the upper pillar drive means to the third roof panel drive means mounted on the first and second pairs of roof panels; and second pivot means, mounted on an other end of each of the upper pillar drive means, for pivotally connecting the other end of each of the upper pillar drive means to the vertical roof panel drive means.

35. The vehicle model of claim 34 further comprising:

angle adjusting means for selectively adjusting the angle of each of the first, second and third pairs of upper pillar members with respect to the associated vertical roof panel drive means.

36. The vehicle model of claim 35 wherein the angle adjusting means comprises:

a spline shaft connected between the second pivot means and the vertical roof panel drive means;

a spline nut engaged with the spline shaft and slidable therealong; and angle adjusting drive means, coupled to the spline nut, for selectively rotating the spline nut and the spline shaft to vary the angular position of the second pivot means with respect to the associated upper pillar member.

37. The vehicle model of claim 29 further comprising:

a first pair of first plates slidably mounted on the platform on opposite sides of the longitudinal axis of the platform;

a second pair of first plates slidably mounted on the platform on opposite sides of the longitudinal axis of the platform and spaced longitudinally from the first pair of first plates, one of the first pair of first plates and one of the second pair of first plates being spaced apart on each side of the longitudinal axis of the platform and spaced from the longitudinal axis of the platform;

first and second body frame panels mounted on one of the first and second pairs of first plates, on each side of the platform and defining a vehicle door opening therebetween;

one of the ends of each of the first and second body frame panels on each side of the platform being disposed in overlapping telescopingly adjustable arrangement with the opposed body frame panel at a lower portion of the door opening; and a door formed of first and second door panel sections, each having an edge disposed in telescopingly overlapped arrangement with the edge of the opposed first and second door panel section and forming a solid exterior surface in any telescopingly adjustable position, the first door panel section being pivotally connected to the first body frame panel, and the second door panel section being engageable with the second body frame panel.

38. The vehicle model of claim 29 further comprising:

a deck lid body panel mounted on the panel support means, the deck lid body panel including first, second and third deck lid panel sections;

first deck lid panel support means for supporting the first deck lid panel section on one of the second plates on one of the pair of first plates;

second deck lid panel support means for supporting the second deck lid panel section on a second plate on the other of the pair of first plates; and third deck lid panel support means, mounted to and extending between the first and second panel support means, for supporting the third deck lid panel section between the first and second deck lid panel sections;

the first and second deck lid panel sections disposed in telescoping, overlapped relationship with respect to the third deck lid panel section and bi-directionally movable by the first drive means transversely on opposite sides of the third deck lid panel section.

39. The vehicle model of claim 38 further including:

means, mounted on the platform, for selectively adjusting the angle of the first, second and third deck lid panel sections between a first end and a second end thereof, as a unit, with respect to the longitudinal axis of the platform.

* * * * *

UNITED STATES PATENT AND TRADEMARK OFFICE
CERTIFICATE OF CORRECTION

PATENT NO. : 5,384,704

DATED : January 24, 1995

INVENTOR(S) : Kim A. Zeile et al.

It is certified that error appears in the above-identified patent and that said Letters Patent is hereby corrected as shown below:

Column 5, line 63, please delete "29".

Column 6, line 31, please delete column 6, line 31, beginning with "support member ..." through column 7, line 1 up to "... fashion." and insert column 6, line 31, beginning with "support member ..." through column 7, line 1 up to "... fashion." in column 7, line 38, after "The B Pillar".

Column 9, line 46, please delete "is" and insert --as--.

Signed and Sealed this

Sixteenth Day of May, 1995

BRUCE LEHMAN

*Attest:*

*Attesting Officer*     Commissioner of Patents and Trademarks

UNITED STATES PATENT AND TRADEMARK OFFICE
CERTIFICATE OF CORRECTION

PATENT NO. : 5,384,704

DATED : January 24, 1995

INVENTOR(S) : Kim A. Zeile, et al.

It is certified that error appears in the above-indentified patent and that said Letters Patent is hereby corrected as shown below:

In Figure 2, please add "42" and "74".

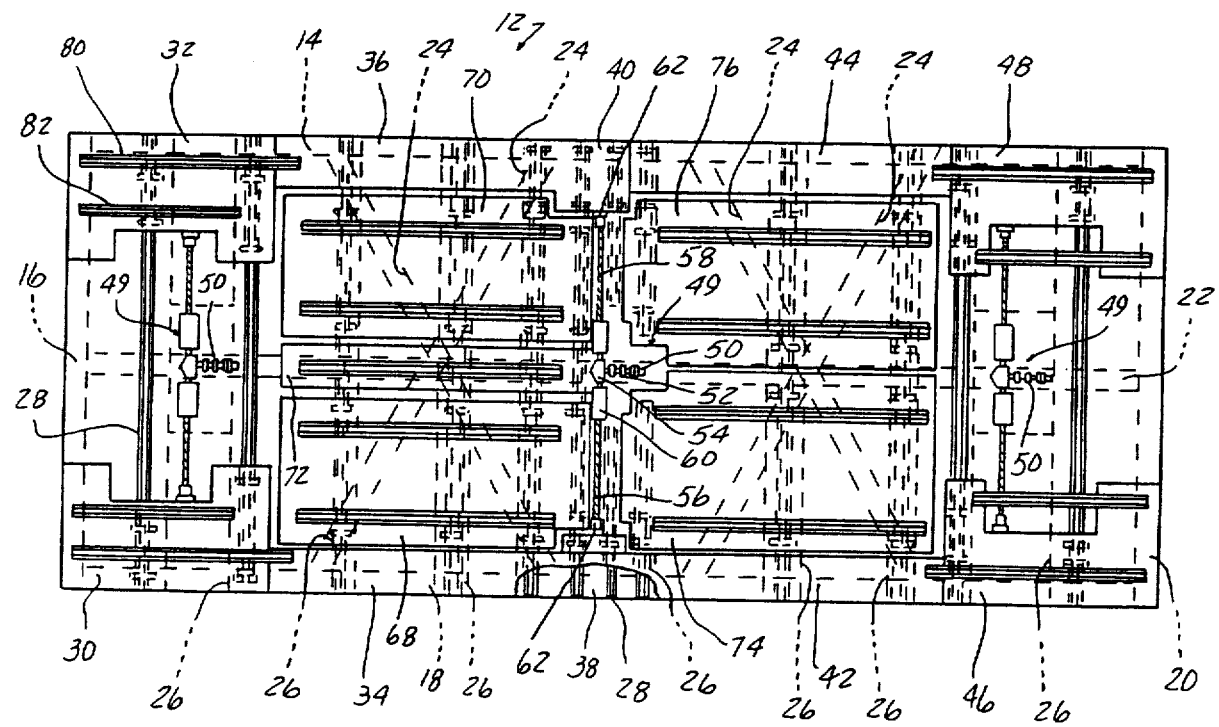

FIG-2

UNITED STATES PATENT AND TRADEMARK OFFICE
CERTIFICATE OF CORRECTION

PATENT NO. : 5,384,704

DATED : January 24, 1995

INVENTOR(S) : Kim A. Zeile, et al.

It is certified that error appears in the above-indentified patent and that said Letters Patent is hereby corrected as shown below:

In Figure 4, please add "134".

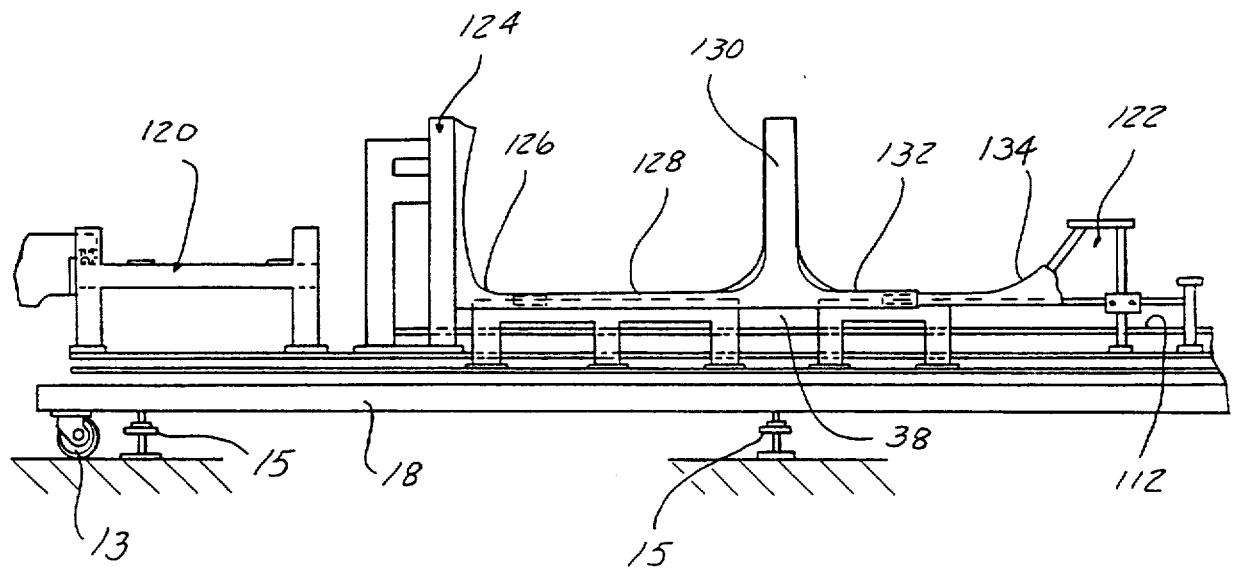

FIG-4

UNITED STATES PATENT AND TRADEMARK OFFICE
CERTIFICATE OF CORRECTION

PATENT NO. : 5,384,704
DATED : January 24, 1995
INVENTOR(S) : Kim A. Zeile et al.

It is certified that error appears in the above-indentified patent and that said Letters Patent is hereby corrected as shown below:

In Figure 7, please add "304".
In Figure 7, please delete "294" and insert --244--.

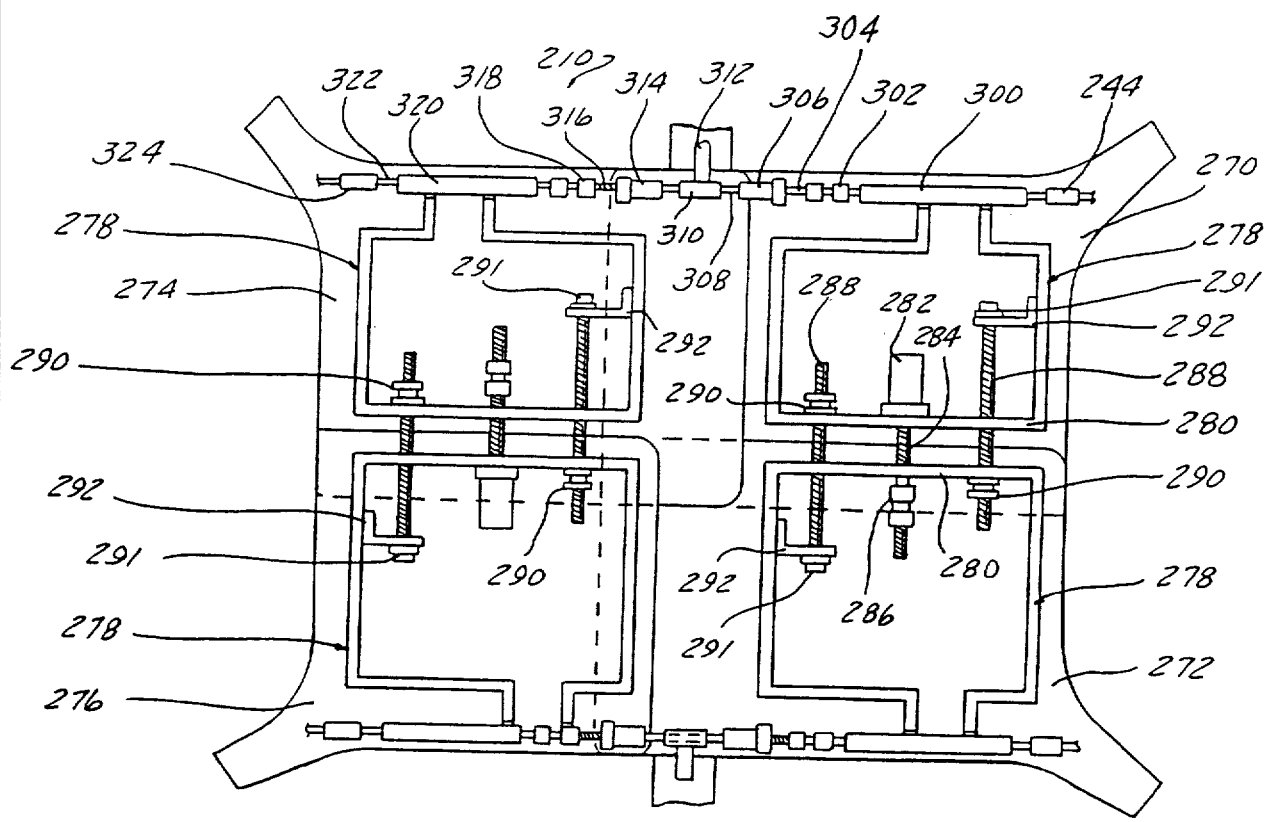

FIG-7

UNITED STATES PATENT AND TRADEMARK OFFICE
CERTIFICATE OF CORRECTION

PATENT NO. : 5,384,704  Page 5 of 6
DATED : January 24, 1995
INVENTOR(S) : Kim A. Zeile, et al.

It is certified that error appears in the above-indentified patent and that said Letters Patent is hereby corrected as shown below:

In Figure 9, please add "362" and "367".

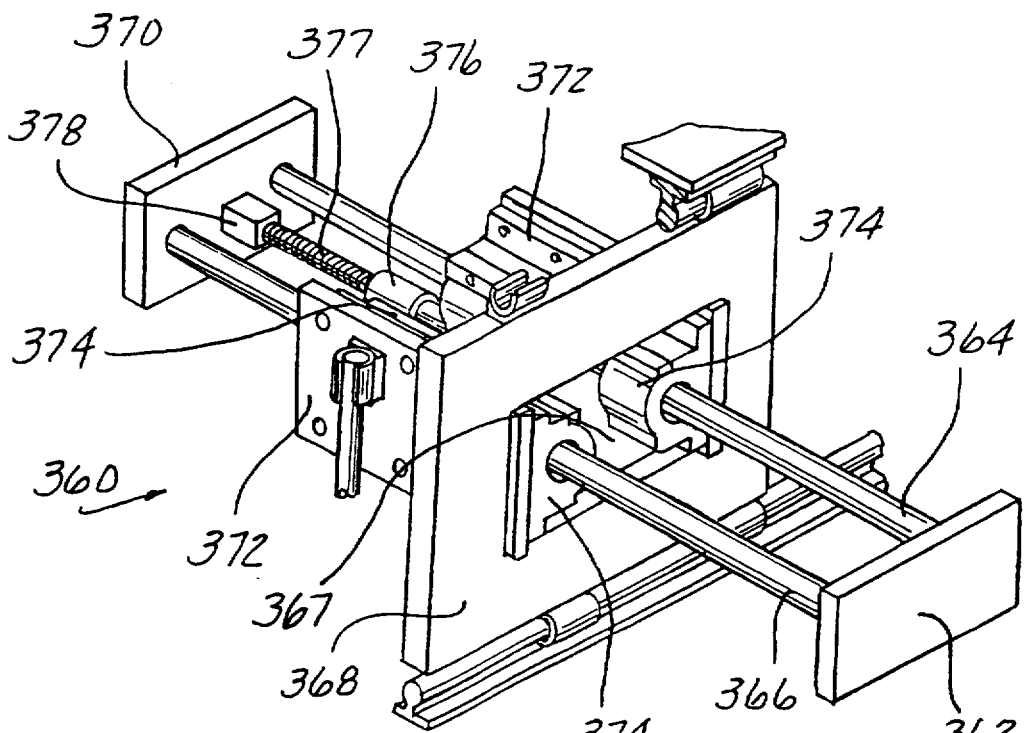

FIG-9

UNITED STATES PATENT AND TRADEMARK OFFICE
CERTIFICATE OF CORRECTION

PATENT NO. : 5,384,704  
DATED : January 24, 1995  
INVENTOR(S) : Kim A. Zeile, et al.

Page 6 of 6

It is certified that error appears in the above-indentified patent and that said Letters Patent is hereby corrected as shown below:

In Figure 10, please add "400".

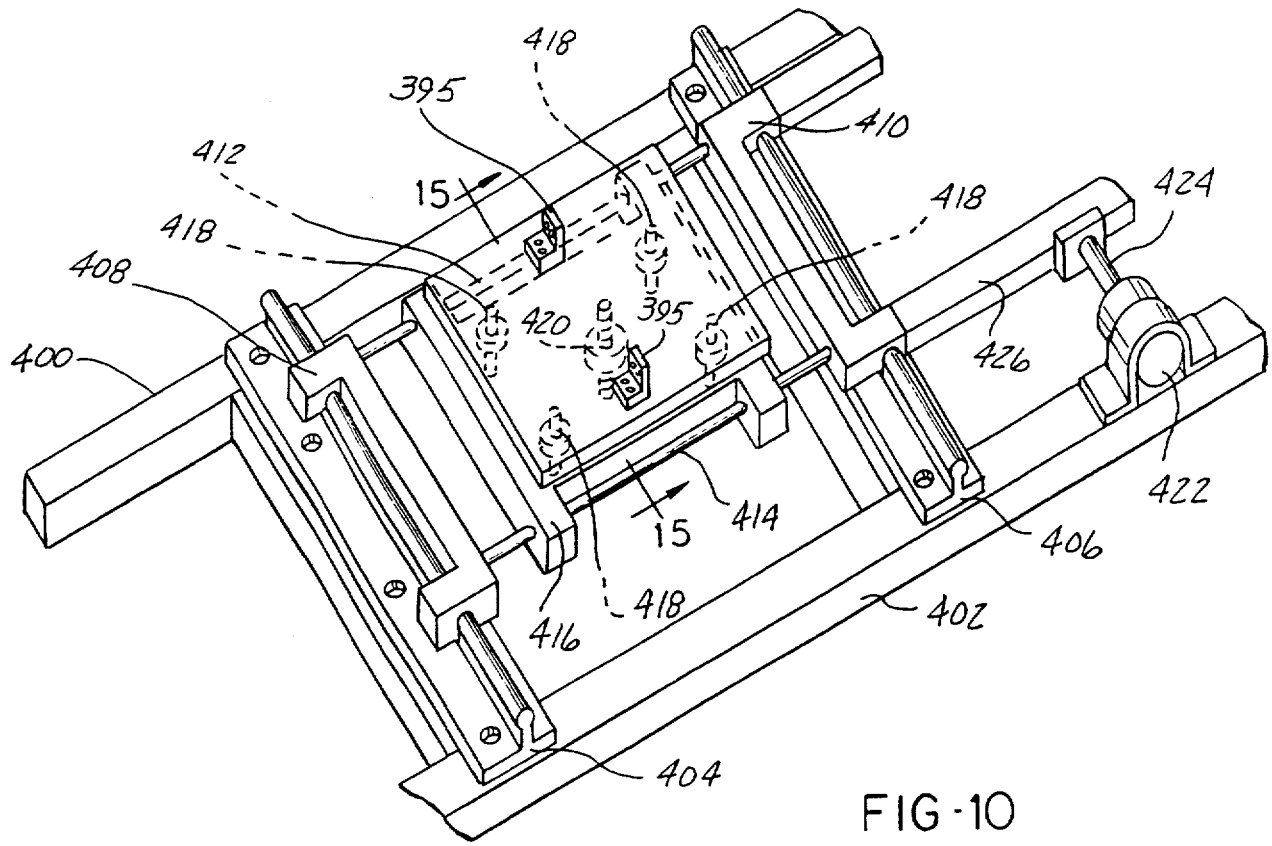

FIG-10